United States Patent
Harscoet et al.

(10) Patent No.: US 11,494,986 B2
(45) Date of Patent: Nov. 8, 2022

(54) SYSTEM AND METHOD FOR TWO DIMENSIONAL APPLICATION USAGE IN THREE DIMENSIONAL VIRTUAL REALITY ENVIRONMENT

(71) Applicant: Samsung Electronics, Co. Ltd., Suwon-si (KR)

(72) Inventors: Philippe Harscoet, Bellevue, WA (US); Kihwan Choi, Suwon-Si (KR); Yoonjeong Heo, Hwasung-Si (KR); Ku In Seog, Anyang-Si (KR); Joungsoo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 150 days.

(21) Appl. No.: 15/896,913

(22) Filed: Feb. 14, 2018

(65) Prior Publication Data
US 2018/0308288 A1 Oct. 25, 2018

Related U.S. Application Data

(60) Provisional application No. 62/487,952, filed on Apr. 20, 2017.

(51) Int. Cl.
*G06T 19/00* (2011.01)
*G02B 27/01* (2006.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
CPC ..... G06T 19/006; G06T 11/00; G06F 3/0481; G06F 3/04815; G06F 3/011; G06F 9/451; G02B 27/225; G02B 27/017
See application file for complete search history.

(56) References Cited

U.S. PATENT DOCUMENTS 8,429,678 B1 * 4/2013 Parthiban .............. H04L 65/765
345/545
8,723,867 B2 5/2014 Saito et al.
(Continued)

FOREIGN PATENT DOCUMENTS

EP 2790405 A2 10/2014
JP 4883529 B2 2/2012
(Continued)

OTHER PUBLICATIONS

ISA/KR, International Search Report and Written Opinion of the International Searching Authority for International Application No. PCT/KR2018/004170, dated Aug. 7, 2018, 13 pages.
(Continued)

*Primary Examiner* — Benyam Ketema

(57) ABSTRACT

An electronic mobile device having a physical display, at least one processor, a volatile memory, and non-volatile memory. Stored in the volatile memory are first instructions for generating a 2D user interface and second instructions for generating a 3D VR environment, and system instructions. In a first operation, the first instructions are executed to generate the 2D user interface and provide the 2D user interface to the physical display. In a second operation, the first instructions are executed to generate the 2D user interface and provide the 2D user interface to a virtual display in the volatile memory. Also, in the second operation, the second instructions are executed to generate the 3D VR environment so as to obtain the 2D user interface from the virtual display and render a 3D image using at least part of the 2D user interface, and provide the 3D image to the physical display.

25 Claims, 10 Drawing Sheets

(51) Int. Cl.
*G06T 11/00* (2006.01)
*G06F 3/04815* (2022.01)
*G06F 3/01* (2006.01)
*G06F 3/0481* (2022.01)
*G06F 9/451* (2018.01)

(52) U.S. Cl.
CPC ........ *G06F 3/0481* (2013.01); *G06F 3/04815* (2013.01); *G06T 11/00* (2013.01); *G06F 9/451* (2018.02)

(56) References Cited

U.S. PATENT DOCUMENTS

| | | | | |
|---|---|---|---|---|
| 8,947,455 | B2* | 2/2015 | Friesen | A43B 3/0078 345/633 |
| 8,957,835 | B2* | 2/2015 | Hoellwarth | G06F 3/16 345/8 |
| 9,176,325 | B2* | 11/2015 | Lyons | G02B 27/028 |
| 9,482,869 | B2* | 11/2016 | Hoellwarth | G02B 27/0093 |
| 9,491,430 | B2 | 11/2016 | Maeta et al. | |
| 9,529,200 | B2* | 12/2016 | Thurber | H04N 21/4126 |
| 9,547,372 | B2* | 1/2017 | Saito | G06F 3/017 |
| 9,569,068 | B2* | 2/2017 | Yeh | G06F 3/04817 |
| 9,599,824 | B2* | 3/2017 | Lyons | G06F 3/0338 |
| 9,628,783 | B2* | 4/2017 | Hoberman | H04N 13/361 |
| 9,696,795 | B2* | 7/2017 | Marcolina | G06T 19/006 |
| 9,729,819 | B2* | 8/2017 | Im | H04N 5/232945 |
| 9,754,419 | B2* | 9/2017 | Petrovskaya | G02B 27/01 |
| 9,766,775 | B2* | 9/2017 | Chi | G06F 3/0425 |
| 9,798,143 | B2* | 10/2017 | Fujimaki | G02B 27/017 |
| 9,823,477 | B1* | 11/2017 | Shen | G02B 27/0172 |
| 9,839,166 | B2* | 12/2017 | Kim | G02B 27/0006 |
| 9,851,091 | B2* | 12/2017 | Im | G02B 27/017 |
| 9,857,863 | B2* | 1/2018 | Kobayashi | G06F 1/1635 |
| 9,880,617 | B2* | 1/2018 | Hong | G06F 3/012 |
| 9,946,393 | B2* | 4/2018 | Kim | G02B 27/017 |
| 9,952,711 | B2* | 4/2018 | Kim | G06F 1/3262 |
| 9,984,505 | B2* | 5/2018 | Rimon | G06T 11/60 |
| 10,010,789 | B2* | 7/2018 | Koizumi | G06F 1/1671 |
| 10,083,544 | B2* | 9/2018 | Chen | G06F 3/005 |
| 10,095,275 | B2* | 10/2018 | Byun | G02B 27/0176 |
| 10,101,783 | B2* | 10/2018 | Cheng | G06F 1/206 |
| 10,134,358 | B2* | 11/2018 | Jung | G06F 3/03547 |
| 10,168,772 | B2* | 1/2019 | Kim | G02B 27/0093 |
| 10,168,981 | B2* | 1/2019 | Song | G06F 3/012 |
| 10,261,579 | B2* | 4/2019 | Wang | G02B 27/0176 |
| 10,275,005 | B2* | 4/2019 | Kang | G06F 1/30 |
| 10,345,925 | B2* | 7/2019 | Du Bois | G06F 3/0346 |
| 10,353,491 | B2* | 7/2019 | Bruza | G06F 3/0346 |
| 10,455,214 | B2* | 10/2019 | Haseltine | G02B 27/0172 |
| 10,474,242 | B2* | 11/2019 | Yin | G06F 3/04886 |
| 2007/0097130 | A1* | 5/2007 | Margulis | G06T 1/20 345/501 |
| 2007/0279412 | A1 | 12/2007 | Davidson et al. | |
| 2009/0013282 | A1* | 1/2009 | Mercer | G06F 3/0481 715/788 |
| 2009/0036149 | A1* | 2/2009 | Liu | H04M 1/724 455/466 |
| 2009/0037509 | A1* | 2/2009 | Parekh | G06F 9/44526 709/201 |
| 2009/0063711 | A1* | 3/2009 | Finkelstein | G06F 16/1787 710/3 |
| 2009/0254856 | A1* | 10/2009 | Cwajbaum | G06F 16/957 715/808 |
| 2010/0079356 | A1* | 4/2010 | Hoellwarth | G06F 3/041 345/8 |
| 2010/0265175 | A1* | 10/2010 | Kabasawa | G06F 3/0346 345/157 |
| 2010/0277575 | A1* | 11/2010 | Ismael | G02B 30/36 359/464 |
| 2011/0037712 | A1* | 2/2011 | Kim | G06F 3/0488 345/173 |
| 2011/0122235 | A1* | 5/2011 | Lee | H04N 13/398 348/51 |
| 2011/0205242 | A1* | 8/2011 | Friesen | G06T 11/60 345/633 |
| 2012/0069000 | A1* | 3/2012 | Kim | H04N 13/144 345/419 |
| 2012/0249475 | A1* | 10/2012 | Murphy | G06F 3/041 345/173 |
| 2013/0109475 | A1 | 5/2013 | Hamano et al. | |
| 2014/0364228 | A1 | 12/2014 | Rimon | |
| 2015/0024368 | A1* | 1/2015 | King, Jr. | G09B 5/02 434/365 |
| 2015/0067603 | A1* | 3/2015 | Tanaka | G06F 3/0346 715/828 |
| 2015/0138645 | A1* | 5/2015 | Yoo | G02B 27/0101 359/630 |
| 2015/0169096 | A1* | 6/2015 | Nishizawa | G06F 3/017 345/173 |
| 2015/0205484 | A1* | 7/2015 | Morishita | G02B 27/017 348/46 |
| 2015/0234192 | A1* | 8/2015 | Lyons | G06F 3/0231 345/8 |
| 2015/0234456 | A1* | 8/2015 | Cho | G02B 27/0172 345/156 |
| 2015/0269780 | A1* | 9/2015 | Herman | G02B 27/017 345/633 |
| 2016/0011425 | A1* | 1/2016 | Thurber | G09G 5/00 345/8 |
| 2016/0019720 | A1* | 1/2016 | Thurber | G02B 27/017 345/419 |
| 2016/0042496 | A1* | 2/2016 | Ichimi | G06T 3/40 345/671 |
| 2016/0078791 | A1* | 3/2016 | Helms | H04N 9/3141 348/789 |
| 2016/0093105 | A1* | 3/2016 | Rimon | G06F 3/013 345/633 |
| 2016/0098094 | A1* | 4/2016 | Minkkinen | G06F 3/04883 345/156 |
| 2016/0104460 | A1* | 4/2016 | Kiichle-Gross | G09G 5/393 345/547 |
| 2016/0209658 | A1* | 7/2016 | Zalewski | G02B 27/017 |
| 2016/0224176 | A1* | 8/2016 | Kim | G06F 3/04886 |
| 2016/0261841 | A1 | 9/2016 | Mathew et al. | |
| 2016/0378204 | A1* | 12/2016 | Chen | G06V 20/20 345/156 |
| 2017/0228130 | A1* | 8/2017 | Palmaro | G06F 3/0485 |
| 2017/0244811 | A1* | 8/2017 | McKenzie | G06F 3/017 |
| 2017/0278485 | A1* | 9/2017 | Chen | G06F 3/14 |
| 2017/0322623 | A1* | 11/2017 | McKenzie | G06F 3/011 |
| 2017/0329488 | A1* | 11/2017 | Welker | G06F 3/0304 |
| 2018/0101239 | A1* | 4/2018 | Yin | G06F 3/017 |
| 2020/0142498 | A1* | 5/2020 | Yin | G06F 3/04842 |

FOREIGN PATENT DOCUMENTS

JP 5568610 B2 8/2014
WO 2016/009434 A1 1/2016

OTHER PUBLICATIONS

Supplementary European Search Report dated Jan. 21, 2020 in connection with European Patent Application No. 18 78 7802, 13 pages.

* cited by examiner

SYSTEM AND METHOD FOR TWO DIMENSIONAL APPLICATION USAGE IN THREE DIMENSIONAL VIRTUAL REALITY ENVIRONMENT

CROSS-REFERENCE TO RELATED APPLICATION(S) AND CLAIM OF PRIORITY

This application claims priority under 35 U.S.C. § 119(e) to U.S. Provisional Patent Application No. 62/487,952 filed on Apr. 20, 2017, entitled "System and Method for 2D Applications in Virtual Reality Environment." The content of the above-identified patent document is incorporated herein by reference.

TECHNICAL FIELD

This disclosure relates generally to an electronic device that provides virtual reality. More specifically, this disclosure relates to a system and method for a two dimensional (2D) application to be displayed and used in a three dimensional (3D) virtual reality environment.

BACKGROUND

A user of a virtual reality (VR) device (alternatively referred to as a head mount display (HMD) or VR headset) is often entrenched in a three-dimensional (3D) VR experience, yet there are times that a user of the VR headset may want to be able to use their mobile phone and/or its various functions without having to remove the VR headset. For example, the user may be watching a movie or playing a 3D game using their VR headset, but then may want to write a text message, write an email or make a phone call without removing the their VR headset. In such a situation it would be desirable to be able to display the two-dimensional (2D) user interfaces and/or contents of a mobile phone application to the user in the 3D VR environment.

In certain implementations, a VR device is provided by combining a mobile device, such as a smartphone, and a head mount frame that can be worn on a user's head. The mobile device is inserted or positioned in the head mount frame such that the mobile device's screen is used as a display of the VR device. This type of VR device is often referred to as a "drop-in type VR device." In such implementations, computing resources of the mobile device are used to render a VR image or environment, while the head mount frame may have a limited input mechanism, such as a touchpad and/or a button. In other implementations, a separate hand-held controller may be wirelessly connected to such a VR device.

In such a case, there is a need for a mobile device to efficiently use its available computing power and resources to provide a satisfactory VR environment experience to a user. Such a need is even greater when a user is also able to utilize mobile phone applications, such as streaming digital media, such as a shared video, via a mobile application, and the video is rendered in the drop-in type VR device and presented as part of an image in the 3D VR environment.

SUMMARY

This disclosure provides a system and method for two dimensional application usage in a three dimensional virtual reality environment.

In a first embodiment, an electronic device is provided. The electronic device includes a housing and a physical display exposed through a portion of the housing. The electronic device also includes at least one processor positioned inside the housing and operatively connected to the physical display. A volatile memory is positioned inside the housing and operatively connected to the at least one processor. A non-volatile memory is positioned inside the housing and operatively connected to the at least one on processor. The non-volatile memory is configured to store first instructions for generating a 2-dimensional (2D) user interface, second instructions for generating a 3-dimensional (3D) VR environment; and system instructions. In a first operation, the system instructions, when executed, cause the at least one processor to execute the first instructions for generating the 2D user interface to cause the at least one processor to provide the first graphic data; provide the first graphic to the physical display; and execute the second instructions for generating the 3D VR environment to cause the at least one processor to provide second graphic data to a virtual display provided in the volatile memory. Further, in a second operation, the system instructions when executed, cause the at least one processor to execute the first instructions for generating the 2D user interface to cause the at least one processor to provide the first graphic data; provide the first graphic data to the virtual display; and to execute the second instructions for generating the 3D VR environment to cause the at least one processor to obtain the first graphic data from the virtual display, render a 3D image using at least part of the first graphic data; and provide the rendered 3D image to the physical display.

In a second embodiment, a method is provided. The method includes providing a physical display for viewing through a portion of a housing. The method includes operatively connecting at least one processor to the physical display. The method also includes operatively connecting each of a volatile memory and a non-volatile memory to the at least one processor. The method further includes storing first instructions for generating a 2-dimensional (2D) user interface in the non-volatile memory. The method includes storing second instructions for generating a 3-dimensional (3D) virtual reality (VR) environment in the non-volatile memory and storing system instructions in the non-volatile memory. The method, in a first operation includes providing, by the at least one processor when executing at least some of the first instructions for generating the 2D user interface, first graphic data; displaying the first graphic data in the physical display; and providing by the at least one processor when executing at least some of the second instructions for providing the 3D VR environment, second graphic data to a virtual display provided in the volatile memory. The method, in a second operation, includes providing, by the at least one processor when executing at least some of the first instructions for generating the 2D user interface, the first graphic data to the virtual display; obtaining, by the at least one processor when executing at least some of the second instructions for generating the 3D VR environment, the first graphic data from the virtual display. The method, in the second operation further includes, rendering, by the at least one processor when executing at least some of the second instructions for generating the 3D VR environment, a 3D image using at least part of the first graphic data; and providing the rendered 3D image to the physical display.

In a third embodiment, a non-transitory computer readable medium is provided. The non-transitory computer readable medium includes a plurality of system instructions, that when executed, the plurality of system instructions are configured to cause at least one processor of an electronic device to store, in a non-volatile memory, first instructions for generating a 2-dimensional (2D) user interface. The plurality of instructions are further configured to cause the at least one processor to store, in the non-volatile memory, second instructions for generating a 3-dimensional (3D) VR environment. In a first operation, the plurality of system instructions are configured to cause the at least one processor of an electronic device to execute the first instructions for generating the 2D user interface to cause the at least one processor to provide first graphic data; provide the first graphic data to a physical display; execute the second instructions for generating the 3D VR environment to cause the at least one processor to provide second graphic data to a virtual display provided in a volatile memory. In a second operation, the system instructions, when executed, cause the at least one processor to execute the first instructions for generating the 2D user interface to cause the at least one processor to provide the first graphic data and provide the first graphic data to the virtual display. Furthermore, in the second operation, the system instructions, when executed, cause the at least one processor to execute the second instructions for generating the 3D VR environment to cause the at least one processor to obtain the first graphic data from the virtual display; render a 3D image using at least part of the first graphic data; and provide the rendered 3D image to the physical display.

Other technical features may be readily apparent to one skilled in the art from the following figures, descriptions, and claims. This description includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "A or B," "at least one of A and B," "at least one of A or B" may indicate all of (1) including at least one A, (2) including at least one B, or (3) including at least one A and at least one B.

It is to be understood that the singular forms "a," "an," and "the" include plural referents unless the context clearly dictates otherwise. Thus, for example, reference to "a component surface" includes reference to one or more of such surfaces.

The expressions such as "first," "second" or the like used in various embodiments of the present disclosure may modify various elements regardless of order or importance, and do not limit corresponding elements. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

When it is mentioned that one element (e.g., a first element) is "(operatively or communicatively) coupled with/to or connected to" another element (e.g., a second element), it should be construed that the one element is directly connected to the other element or the one element is indirectly connected to the other element via yet another element (e.g., a third element). In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with expressions such as "suitable for", "having the capability to", "designed to", "adapted to", "made to", or "capable of". The expression "configured to" may not necessarily mean "specially designed to" in terms of hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
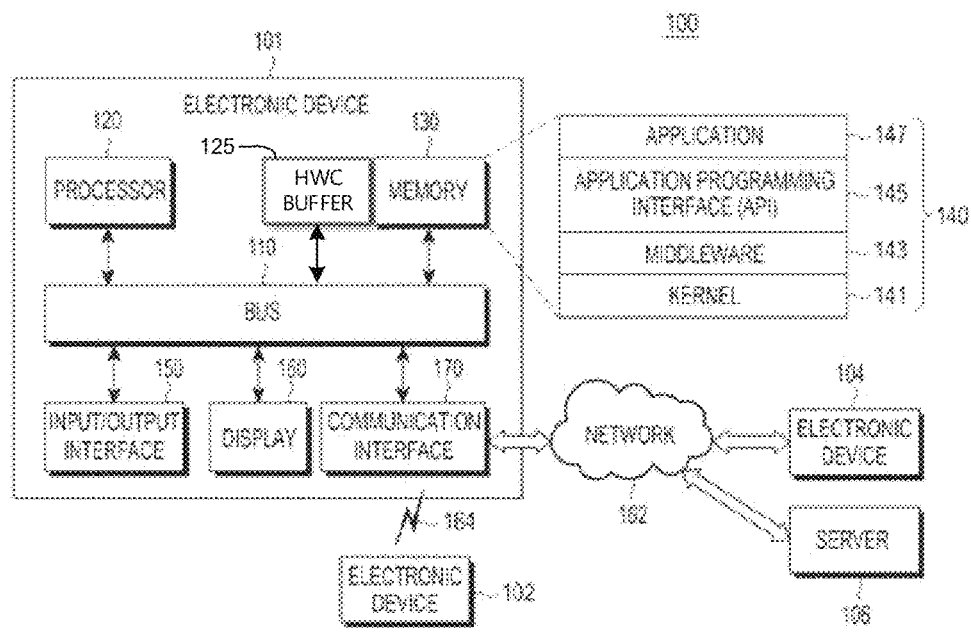
FIG. 1 is a block diagram illustrating a network environment including an electronic device according to various embodiments of the present disclosure.

FIGS. 1 through 16, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

The terms used herein are merely for the purpose of describing particular embodiments of the present disclosure and are not intended to limit the scope of other embodiments. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude the various embodiments of the present disclosure.

For example, an electronic device can be at least one of a smartphone, a tablet personal computer (PC), a mobile phone, mobile device, a video phone, an electronic book (e-book) reader, a desktop PC, a laptop PC, a netbook computer, a workstation server, a personal digital assistant (PDA), a portable multimedia player (PMP), a Moving Picture Experts Group phase 1 or phase 2 (MPEG-1 or MPEG-2) audio layer-3 (MP3) player, a mobile medical appliance, a camera, and a wearable device (e.g., a head-mounted-device (HMD) such as electronic glasses, electronic clothes, an electronic bracelet, an electronic necklace, an electronic accessory, electronic tattoos, or a smart watch).

According to some embodiments of the present disclosure, the electronic device may be a smart home appliance. The smart home appliance may, for example, include at least one of a television (TV), a digital versatile disc (DVD) player, an audio player, a refrigerator, an air conditioner, a cleaner, an oven, a microwave oven, a washing machine, an air purifier, a set-top box, a home automation control panel, a security control panel, a TV box (e.g., HOMESYNC, APPLE TV, or GOOGLE TV), a game console (e.g., XBOX, PLAYSTATION'), an electronic dictionary, an electronic key, a camcorder, and an electronic frame.

According to an embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller machine (ATM) in a bank, a point of sale (POS) in a shop, or internet device of things (e.g., a light bulb, various sensors, an electric or gas meter, a sprinkler device, a fire alarm, a thermostat, a streetlamp, a toaster, sporting goods, a hot water tank, a heater, a boiler, etc.).

According to some embodiments of the present disclosure, the electronic device may include at least one of furniture or a part of a building/structure, an electronic board, an electronic signature receiving device, a projector, and various types of measuring devices (for example, a water meter, an electric meter, a gas meter, a radio wave meter and the like) including a camera function.

In various embodiments of the present disclosure, the electronic device may be a combination of one or more of the aforementioned various devices. According to some embodiments of the present disclosure, the electronic device may also be a flexible device. Also, the electronic device according to various embodiments of the present disclosure is not limited to the above-mentioned devices, and with the development of technology, may include new electronic devices.

Hereinafter, an electronic device according to various embodiments of the present disclosure will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure and in which embodiments of the present disclosure may be implemented. The embodiment of the electronic device 101 illustrated in FIG. 1 is for illustration only, the electronic device 101 comes in a wide variety of configurations and FIG. 1 does not limit the scope of this disclosure to any particular implementation of an electronic device.

In various embodiments, the electronic device 101 may take on different forms, and the present disclosure is not limited to any particular form. For example, the electronic device 101 can be head-mountable display. The electronic device 101 can also be a mobile communication device, such as for example, a user equipment, a mobile device, a mobile station, a subscriber station, a wireless terminal, a smart phone, a tablet, etc., that is mountable with a head set or virtual reality (VR) and/or augmented reality (AR) applications. In other examples, the electronic device 101 can include a headset and take the form of a wearable electronic device, such as for example, glasses, goggles, a helmet, etc., for VR and/or AR applications.

Referring to FIG. 1, an electronic device 101 in a network environment 100 includes a bus 110, a processor 120, a hardware composer 125, a memory 130, an input/output interface 150, a display 160, and a communication interface 170. In some embodiments of the present disclosure, the electronic device 101 may omit at least one of the above components 110 to 170 or further include other components.

The bus 110 may include, for example, a circuit for connecting the components 110 to 170 of the electronic device 101 and transmitting communication (for example, control messages and/or data) between the components.

The processor 120 may include one or more of a CPU, an AP, a graphic processor unit (GPU) and a communication processor (CP). The processor 120, for example, can carry out operations or data processing relating to control and/or communication of at least one other element of the electronic device 101.

The processor 120 may be called a controller, or may include a controller as a part thereof or constitute a part of the controller. The controller may control at least one other component of the electronic device 101, for example, the memory 130, the input/output interface 150, the display 160, and the communication interface 170 to perform operations according to a display method according to various embodiments of the present disclosure.

The hardware composer (HWC) 125 is a hardware abstraction that supports the display 160. Graphic composition work can be delegated to the HWC 125 to offload computational graphic related processing from the processor(s) GPU or CPU 120. In various embodiments, an application called SURFACEFLINGER or an equivalent application (app) can delegate composition of buffers with the available hardware. In some embodiments the HWC is partially an application 147 and/or can operate as middleware 143 The HWC 125 has a primary purpose of determining the most efficient way to composite buffers with the available hardware so as to compose multiple buffers together in the display hardware rather than in the GPU. For example, in a mobile phone, in portrait orientation, there can be a status bar on top as layer 1, a navigation bar at the bottom as layer 2, and application content associated with a mobile phone application everywhere else as layer 3. Here, the contents for each layer 1, 2 and 3 are in three separate buffers that in various embodiments can be, for example, in a volatile memory portion of the memory 130. A mobile device is more energy efficient when the GPU is not used to create a scratch buffer that contains the layers, one at a time, and then passing the scratch buffer contents of the three layers to the display hardware 160. Instead, it is more energy and time efficient to pass each of the layers to separate buffers controlled by the HWC 125 and instructing the display hardware 160 to read data from the different HWC buffers 125 to the different parts of the physical display or other display hardware.

The memory 130 includes a volatile memory and/or a non-volatile memory. The memory 130 may store, for example, commands or data related to at least one of the other components of the electronic device 101. The volatile memory can be used as a buffer for storing one or more layers of the graphic content that can be displayed on the display hardware 160. According to an embodiment of the present disclosure, the memory 130 stores software and/or a program 140. For example, the program 140 includes a kernel 141, middleware 143, an application programming interface (API) 145, and/or application programs (applications, aps or mobile apps) 147. At least some of the kernel 141, the middleware 143, and the API 145 may be referred to as an operating system (OS).

The kernel 141 controls or manages system resources (for example, the bus 110, the processor 120, or the memory 130) used for executing an operation or function implemented by other programs (for example, the middleware 143, the API 145, or the application program 147). Furthermore, the kernel 141 provides an interface through which the middleware 143, the API 145, or the application program 147 may access individual components of the electronic device 101 to control or manage system resources.

The middleware 143 serves as, for example, an intermediary for allowing the API 145 or the application programs 147 to communicate with the kernel 141 to exchange data. Furthermore, with regard to task requests received from the applications 147, the middleware 143 may perform a control for example, scheduling or load balancing for the task requests using, for example, a method of assigning a priority, by which the system resources, for example, the bus 110, the processor 120, or the memory 130 of the electronic device 101 may be preferentially used, to at least one of the applications 147.

The API 145 is, for example, an interface by which the applications 147 control functions provided from the kernel 141 or the middleware 143, and can include, for example, at least one interface or function, such as for example, commands for file control, window control, image processing, or text control.

The input/output interface 150 can serve as an interface capable of delivering a command or data, which is input from a user or another external device, to the component(s) other than the input/output interface 150 within the electronic device 101. Furthermore, the input/output interface 150 outputs the instructions or data received from the other component(s) of the electronic device 101 to the user or another external device.

The display 160 can include a liquid crystal display (LCD), a light-emitting diode (LED) display, an organic LED (OLED) display, a microelectromechanical systems (MEMS) display, and an electronic paper display. For example, the display 160 displays various pieces of content, for example, text, images, videos, icons, symbols, and the like to the user. The display 160 includes a touch screen and receives, for example, a touch, gesture, proximity, or hovering input using an electronic pen or the user's body part.

The communication interface 170 configures communication between, for example, the electronic device 101 and an external device such as, a first external electronic device 102, a second external electronic device 104, or a server 106. For example, the communication interface 170 may be connected to a network 162 through wireless or wired communication to communicate with the external device, for example, the second external electronic device 104 or the server 106. In various embodiments, the communication interface 170 can also communicate with an external device, such as the first external electronic device 102, using a wireless communication 164.

The wireless communication can include at least one of, for example, Wi-Fi, BLUETOOTH (BT), near field communication (NFC), GPS, and cellular communication (for example, long term evolution (LTE), LTE-advanced (LTE-A), code division multiple access (CDMA), wideband CDMA (WCDMA), universal mobile telecommunication system (UMTS), wireless broadband (WiBro), global system for mobile communications (GSM), and the like). The wired communication can include at least one of, for example, a universal serial bus (USB), a high definition multimedia interface (HDMI), a recommended standard 232 (RS-232), and a plain old telephone service (POTS).

According to an embodiment of the present disclosure, the network 162 includes a telecommunication network, for example, at least one of a computer network (for example, a local area network (LAN) or a wide area network (WAN)), Internet, and a telephone network.

Each of the first and second external electronic devices 102 and 104 can be a device that is the same as or different from the electronic device 101. According to an embodiment of the present disclosure, the server 106 can include a group of one or more servers. According to various embodiments of the present disclosure, all or some of the operations performed by the electronic device 101 can be performed by another electronic device or a plurality of electronic devices. For example, all or some of the operations can be performed by one or more of the first external electronic device 102, the second external electronic device 104, or the server 106. According to an embodiment of the present disclosure, when the electronic device 101 should perform some functions or services automatically or by a request, the electronic device 101 makes a request for performing at least some functions related to the functions or services to another device such as the first external electronic device 102, the second external electronic device 104, or the server 106 instead of performing the functions or services by itself. The other electronic device, being the first external electronic device 102, the second external electronic device 104, or the server 106 can carry out the requested function or the additional function, and transfer a result thereof to the electronic device 101. The electronic device 101 can also provide the requested functions or services based on the received result directly or after additional processing of the received result. To achieve this, for example, cloud computing, distributed computing, or client-server computing technology may be used.

According to an embodiment of the present disclosure, the electronic device 102 can be a head mounted electronic device (HMD) that can be used while being attachable to and detachable from another electronic device such as the electronic device 101. In this case, the electronic device 102 may not include a display. For example, when the electronic device 101 is used while being coupled to the electronic device 102, the electronic device 101 provides, through the display 160, a screen to the user who wears an electronic device to which the electronic device 101 and the electronic device 102 are coupled.

Figure 2:
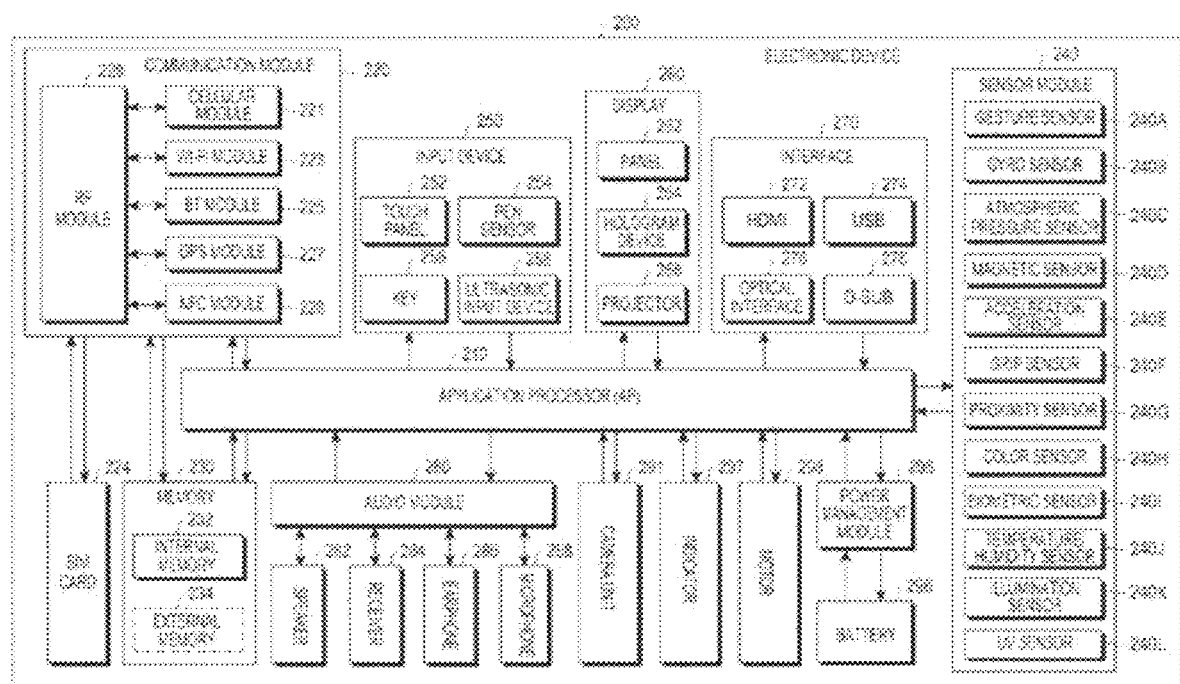
FIG. 2 is a block diagram of an electronic device according to various embodiments of the present disclosure.

FIG. 2 is a block diagram of an electronic device 200 according to various embodiments of the present disclosure. In various embodiments, the electronic device 200 may take on different forms, and the present disclosure is not limited to any particular form. For example, the electronic device 200 can be head-mountable display (HWD). The electronic device 200 can also be a mobile communication device, such as for example, a user equipment, a mobile station, a subscriber station, a wireless terminal, a smart phone, a tablet, etc., that is mountable or connectable to a head set for virtual reality (VR) and/or augmented reality (AR) applications. In other examples, the electronic device 200 can include a headset and take the form of a wearable electronic device, such as for example, glasses, goggles, a helmet, etc., for VR and/or AR applications.

Referring to FIG. 2, the electronic device 200 may include the entirety or part of the electronic device 101 illustrated in FIG. 1. The electronic device 200 may include at least one application processor (AP) 210, a communication module 220, a subscriber identifier module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may control a plurality of hardware or software components connected to the processor 210 by driving, for example, an OS or an application program and perform various types of data processing and calculations. In some embodiments, the AP 210 is implemented by, for example, a system on chip (SoC). According to an embodiment of the present disclosure, the AP 210 can further include a graphical processing unit (GPU) and/or an image signal processor. The AP 210 may include at least some of the components (for example, a cellular module 221) illustrated in FIG. 2. The AP 210 can load commands or data received from at least one of the other components in a volatile memory, which may be included in the memory 230, process the loaded commands or data, and store various pieces of data in the non-volatile memory.

The communication module 220 may have a configuration equal or similar to that of the communication interface 170 of FIG. 1. According to an embodiment of the present disclosure, the communication module 220 includes a cellular module 221, a Wi-Fi module 223, a Bluetooth (BT) module 225, a GPS module 227, a near field communication (NFC) module 228, and a radio frequency (RF) module 229.

The cellular module 221 provides a voice call, an image call, a text message service, or an Internet service through, for example, a communication network. According to an embodiment of the present disclosure, the cellular module 221 can distinguish and authenticate the electronic device 200 within a communication network using a subscriber identification module (a SIM card) 224. According to an embodiment of the present disclosure, the cellular module 221 can perform at least some of the functions, which can be provided by the AP 210. According to an embodiment of the present disclosure, the cellular module 221 may include a CP.

The Wi-Fi module 223, the BT module 225, the GPS module 227, and the NFC module 228 may include a processor for processing data transmitted/received through the corresponding module. According to some embodiments of the present disclosure, at least some (for example, two or more) of the cellular module 221, the Wi-Fi module 223, the BT module 225, the GPS module 227, and the NFC module 228 may be included in one integrated chip (IC) or IC package.

The RF module 229 can transmit/receive communication signals such as, for example, RF signals. The RF module 229 includes, for example, a transceiver, a power amplifier module (PAM), a frequency filter, a low noise amplifier (LNA), and an antenna. According to an embodiment of the present disclosure, at least one of the cellular module 221, the Wi-Fi module 223, the BT module 225, the GPS module 227, and the NFC module 228 transmit and receive RF signals through a separate RF module.

The SIM card 224 includes a card including a subscriber identification module and/or an embedded SIM, and contain unique identification information such as, for example, an integrated circuit card identifier (ICCID) or a subscriber information such as, for example, an international mobile subscriber identity (IMSI).

The memory 230 can include an internal memory 232 and/or an external memory 234. The internal memory 232 may include at least one of, for example, a volatile memory such as, for example, a dynamic random access memory (DRAM), a static RAM (SRAM), a synchronous DRAM (SDRAM), and the like. The internal memory 232 can also include a non-volatile memory such as for example, a onetime programmable read only memory (OTPROM), a programmable ROM (PROM), an erasable and programmable ROM (EPROM), an electrically erasable and programmable ROM (EEPROM), a flash memory (for example, a NAND flash memory or a NOR flash memory), a hard driver, or a solid state drive (SSD).

The external memory 234 can include a flash drive, for example, a compact flash CF, a secure digital (SD), a micro-SD, a mini-SD, an extreme digital (xD), a memory stick, or the like. The external memory 234 may be functionally and/or physically connected to the electronic device 200 through various interfaces.

The sensor module 240 measures physical quantities such as distances or detect an operation state of the electronic device 200, and may convert the measured or detected information into an electrical signal. The sensor module 240 can include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor (e.g., a red, green, blue (RGB) sensor) 240H, a biometric sensor 2401, a temperature/humidity sensor 2401, an illuminance sensor 240K, and an ultra violet (UV) sensor 240L. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments of the present disclosure, the electronic device 200 may further include a processor configured to control the sensor module 240 as a part of or separately from the AP 210, and may control the sensor module 240 while the AP 210 is in a sleep state.

The input device 250 can be one or more of a touch panel 252, a (digital) pen sensor 254, a key 256, or an ultrasonic input device 258. The touch panel 252 can use at least one of, for example, a capacitive type, a resistive type, an IR type, and an ultrasonic type. The touch panel 252 can further include a control circuit. The touch panel 252 can also include a tactile layer and provide a tactile reaction to the user.

The (digital) pen sensor 254 can include, for example, a recognition sheet which is a part of the touch panel or is separated from the touch panel. The key 256 can include, for example, a physical button, an optical key, or a keypad. The ultrasonic input device 258 detects an acoustic wave using a microphone 288 of the electronic device 200 through an input tool generating an ultrasonic signal to identify data.

The display 260, which can be the display 160 in FIG. 1, can include a panel 262, a hologram device 264, or a projector 266. The panel 262 may include a configuration identical or similar to that of the display 160 illustrated in FIG. 1. The panel 262 can be implemented to be, for example, flexible, transparent, or wearable. The panel 262 can be formed as a single module together with the touch panel 252. The hologram device 264 may project a three dimensional image in the air by using an interference of light. The projector 266 can display an image by projecting light onto a screen. The screen can be located, for example, in the interior of or on the exterior of the electronic device 200. According to an embodiment of the present disclosure, the display 260 can further include a control circuit for controlling the panel 262, the hologram device 264, or the projector 266.

The interface 270 can be an HDMI 272, a USB 274, an optical interface 276, or a D-subminiature (D-sub) 278. The interface 270 can be included in, for example, the communication interface 170 illustrated in FIG. 1. Additionally or alternatively, the interface 270 can include, for example, a mobile high-definition link (MHL) interface, an SD card/multi-media card (MMC) interface, or an infrared data association (IrDA) standard interface.

The audio module 280 can be configured to bilaterally convert, for example, a sound and an electrical signal. At least some components of the audio module 280 can also be included in, for example, the input/output interface 150 illustrated in FIG. 1. The audio module 280 can process sound information input or output through, for example, a speaker 282, a receiver 284, earphones 286, or the microphone 288.

The camera module 291 is a device that can photograph a still image and a dynamic image. According to an embodiment of the present disclosure, the camera module 291 includes one or more image sensors such as, for example, a front sensor or a back sensor, a lens, an image signal processor (ISP) or a flash, for example, LED or xenon lamp flash.

The power management module 295 manages, for example, power of the electronic device 200. According to an embodiment of the present disclosure, the power management module 295 includes a power management IC (PMIC), a charger IC, or a battery or fuel gauge. The PMIC can use a wired and/or wireless charging method. Examples of the wireless charging method include, for example, a magnetic resonance method, a magnetic induction method, an electromagnetic method, and the like. Additional circuits, such as a coil loop, a resonance circuit, or a rectifier circuit, that are used for wireless charging can also be included. The battery gauge is configured to measure, for example, a residual charge quantity of the battery 296 that can include a voltage, a current, or a temperature of the battery while charging or discharging the battery. The battery 296 may include, for example, a rechargeable battery or a solar battery.

The indicator 297 can be configured to display a predetermined state of the electronic device 200 or a part of the electronic device 200 such as the AP 210. The indicator can display information relating to a booting state, a message state, a charging state, or the like of the device 200. The motor 298 converts an electrical signal into a mechanical vibration in order to generate, for example, a vibration, a haptic effect, or the like. Although not specifically illustrated, the electronic device 200 includes a processing device, for example, a GPU and/or an associated hardware composer, for supporting mobile TV and other applications that process visual graphic data. The processing device for supporting a mobile TV can process media data according to a standard of digital multimedia broadcasting (DMB), digital video broadcasting (DVB), MEDIAFLO, or the like.

Each of the components of the electronic device according to the present disclosure can be implemented by one or more components and the name of the corresponding component may vary depending on a type of the electronic device. In various embodiments of the present disclosure, the electronic device includes at least one of the above-described elements. Some of the above-described elements may be omitted from the electronic device, or the electronic device may further include additional elements. Further, in various embodiments, some of the components of the electronic device are combined to form a single entity, and thus, equivalently execute functions of the corresponding elements prior to the combination.

Figure 3:
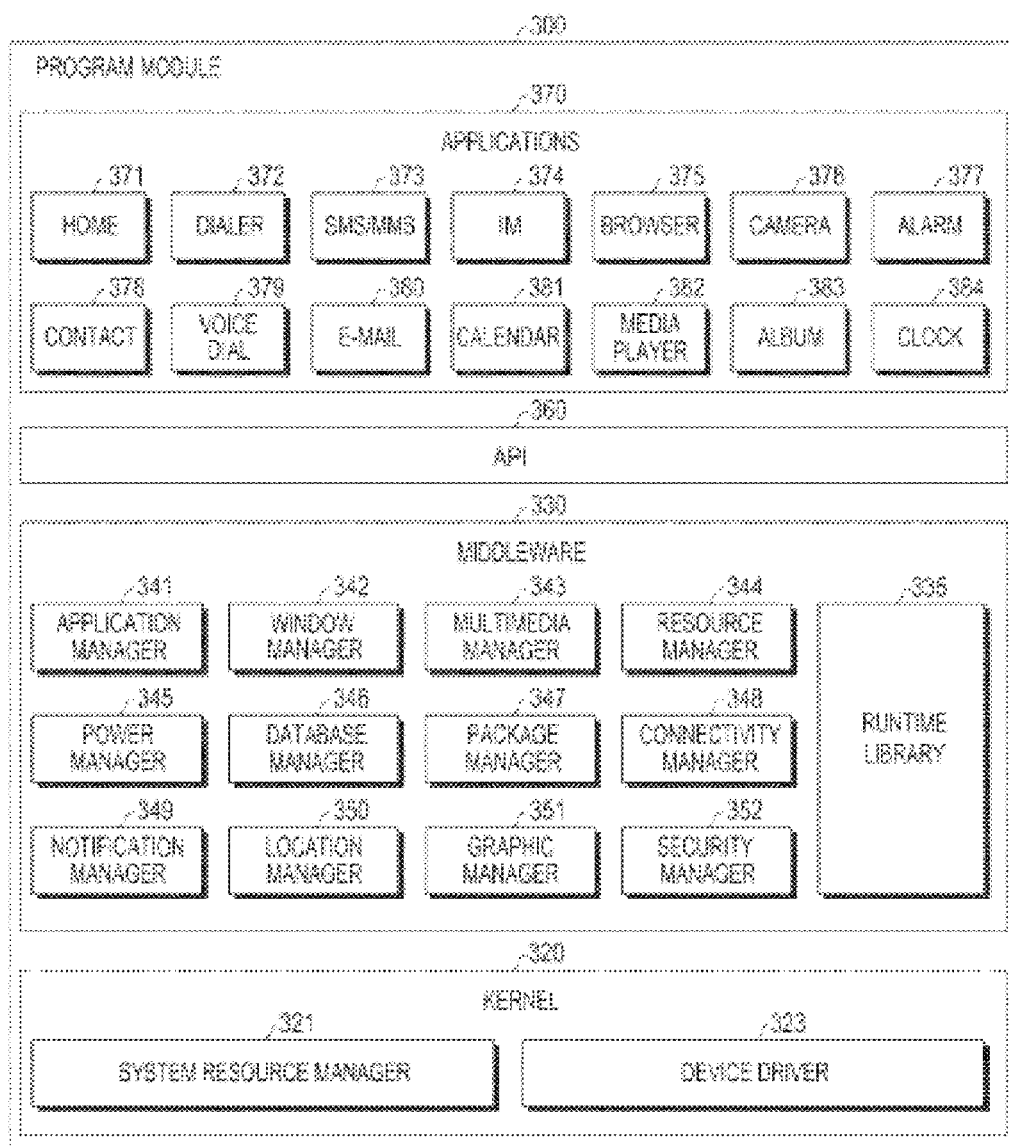
FIG. 3 is a block diagram of a program module according to various embodiments of the present disclosure.

FIG. 3 is a block diagram of a program module 300 according to various embodiments of the present disclosure. The embodiment of the program module 300 is for illustration only, the program module 300 can be configured in a wide variety of configurations, and FIG. 1 does not limit the scope of this disclosure to any particular implementation of a program module.

Referring to FIG. 3, according to an embodiment of the present disclosure, a program module 300 (see also, the program 140 in FIG. 1 and the memory 230 in FIG. 2) may include an operating system (OS) for controlling resources related to the electronic device, such as electronic devices 101 or 200 and/or various applications, such as for example, the application program 147 executed in the OS. The OS can be any of a variety of operating systems including, for example, ANDROID, IOS, WINDOWS, SYMBIAN, TIZEN, BADA, or the like.

The program module 300 often includes one or more of a kernel 320, a middleware 330, an API 360, and/or applications 370. At least some of the program module 300 can be preloaded in the electronic device, such as in the electronic device 101 and/or can be downloaded in the server, such as from the server 106).

The kernel 320, such as for example, the kernel 141, can include a system resource manager 321 or a device driver 323. The system resource manager 321 performs control, allocation, retrieval, or the like of system resources. According to an embodiment of the present disclosure, the system resource manager 321 includes a process manager, a memory manager, a file system manager, or the like. The device driver 323 can include one or more of a display driver, a camera driver, a BT driver, a shared memory driver, a USB driver, a keypad driver, a Wi-Fi driver, an audio driver, or an inter-process communication (IPC) driver.

The middleware 330 provides a function required by the applications 370 in common or provide various functions to the applications 370 through the API 360 so that the applications 370 can efficiently use limited system resources within the electronic device 101 or 200. According to an embodiment of the present disclosure, the middleware 330 (for example, the middleware 143) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 includes a library module that a compiler uses in order to add a new function through a programming language while an application 370 is being executed. The runtime library 335 can perform input/output management, memory management, the functionality for an arithmetic function, or the like.

The application manager 341 manages, for example, a life cycle of at least one of the applications 370. The window manager 342 can manage graphical user interface (GUI) resources used by a screen. The multimedia manager 343 detects formats required for reproduction of various media files, and performs encoding or decoding of a media file by using a codec suitable for the corresponding format. The resource manager 344 can manage resources such as a source code, a memory, and a storage space of at least one of the applications 370.

The power manager 345 operates together with a basic input/output system (BIOS) to manage a battery or power source. The power manager 345 provides power information required for the operation of the electronic device. The database manager 346 can generate, search for, or change a database to be used by at least one of the applications 370. The package manager 347 can manage an installation or an update of an application distributed in the form of a package file.

The connectivity manager 348 manages wireless connectivity such as Wi-Fi or BT. The notification manager 349 is configured to display or notify of an event such as an arrival message, a promise, a proximity notification, and the like in such a way that does not disturb a user. The location manager 350 manages location information of an electronic device. The graphic manager 351 manages a graphic effect that can be provided to a user, or a user interface related to the graphic effect. The security manager 352 provides all security functions required for system security or user authentication. According to an embodiment of the present disclosure, when the electronic device, for example, the electronic device 101, has a telephone call function, the middleware 330 can further include a telephony manager for managing a voice call function or a video call function of the electronic device.

The middleware 330 includes a middleware module that forms a combination of various functions of the above-described elements of FIGS. 1, 2, and 3. The middleware 330 provides a module specialized for each type of OS in order to provide a differentiated function. Further, the middleware 330 may dynamically remove some of the existing components or add new components.

The API 360, for example, the API 145, includes a set of API programming functions, and is configured differently in various embodiments according to the OS in the device. For example, in the case of ANDROID or IOS, one API set may be provided for each platform. In the case of TIZEN, two or more API sets may be provided for each platform.

The applications 370, for example, the applications 147, include one or more of a home application 371, a dialer 372, a short message service (SMS)/multimedia message service (MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (for example, an application for measuring a work rate or blood sugar), and an environmental information application (for example, an application for providing atmospheric pressure, humidity, or temperature information).

According to an embodiment of the present disclosure, the applications 370 can also include an information exchange application that supports information exchange between the electronic device, for example, the electronic device 101, and an external electronic device, for example, the first external electronic device 102 or the second external electronic device 104. Examples of the information exchange application include a notification relay application that delivers particular information to an external electronic device and a device management application for managing an external electronic device.

For example, the notification relay application can include a function of transferring, to the external electronic device, for example, to the first external electronic device 102 or the second external electronic device 104, notification information generated from the one or more other applications of the electronic device. Such notification information can be generated by, for example, the SMS/MMS application, the e-mail application, the health management application, and the environmental information application. Also, for example, the notification relay application can receive notification information from the external electronic device and provide the received notification information to the user.

The device management application manages, for example, the install, deletion, or update, of a function of at least a part of the external electronic device that is communicating with the electronic device. For example, the device management application can, turn on/off the external electronic device itself or some elements thereof. The device management application can also adjust brightness, resolution or other visual display parameters of a display. In various embodiments, the device management application can control aspects of applications executed in the external electronic device, or services provided from the external electronic device, such as control aspect of a telephone call service or a message service).

According to an embodiment of the present disclosure, the applications 370 includes a health management application specified according to attributes, for example, attributes of the electronic device, such as when the electronic device is or is operating as a mobile medical device and, in some embodiments, also according to attributes of the external electronic device, for example, according to attributes of the first external electronic device 102 or the second external electronic device 104. According to an embodiment of the present disclosure, the applications 370 includes an application received from the external electronic device, for example, the server 106, the first external electronic device 102, or the second external electronic device 104. According to an embodiment of the present disclosure, the application 370 includes a preloaded application or a third party application that was downloaded from the server. Names of the elements of the program module 300, according to the various embodiments of the present disclosure, may change depending on the type of OS.

According to various embodiments of the present disclosure, at least a part of the programming module 300 is implemented in software, firmware, hardware, or a combination of two or more thereof. At least a portion of the programming module 300 is, for example, implemented and/or executed by a processor, such as the AP 210. At least a portion of the program module 300 includes, for example, a module, a program, a routine, a set of instructions, and/or a process for performing one or more functions associated with the electronic device.

Figure 4:
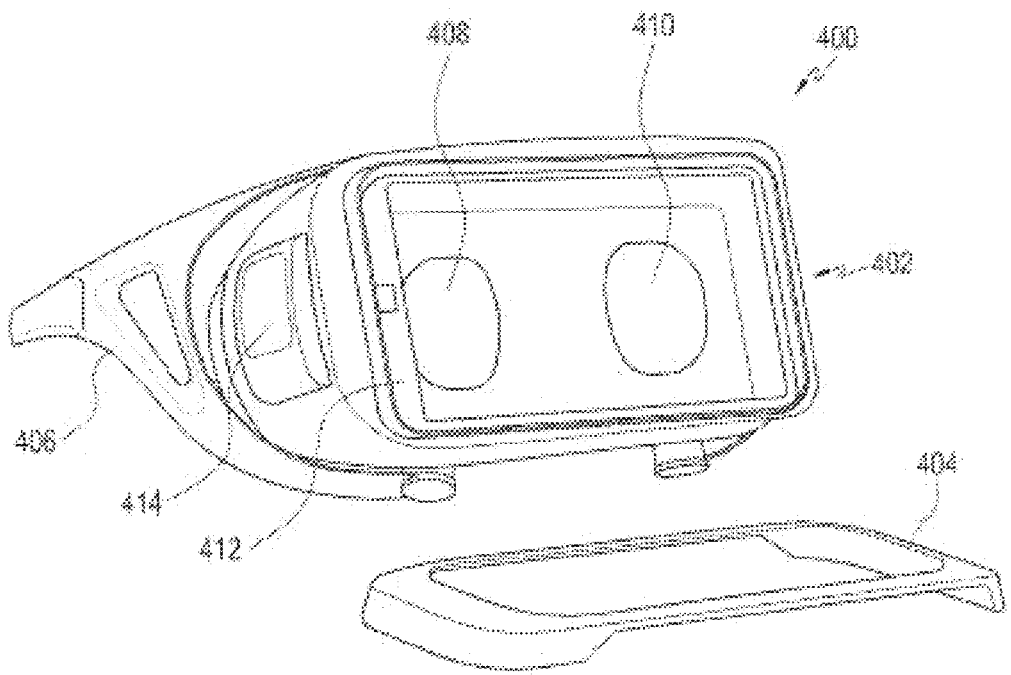
FIG. 4 is a perspective view illustrating an example of a head mounted electronic device according to various embodiments of the present disclosure.
Figure 5:
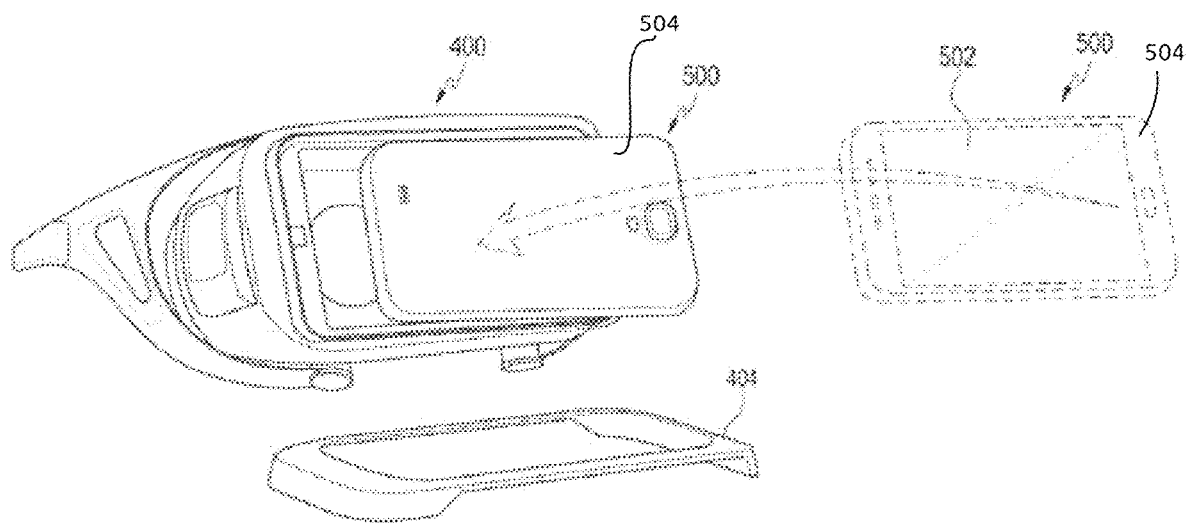
FIG. 5 is a perspective view illustrating an example in which electronic devices are coupled according to various embodiments of the present disclosure.

FIGS. 4 and 5 are a perspective views illustrating an example of a head mounted electronic device (HMD) 400 according to various embodiments of the present disclosure and in which embodiments of the present disclosure may be implemented. The embodiment of the HMD 400 illustrated in FIGS. 4 and 5 are for illustration only, the HMD 400 comes in a wide variety of configurations, and FIGS. 4 and 5 do not limit the scope of the disclosure to any particular implementation of a HMD.

Referring to FIGS. 4 and 5, a HMD 400 can be, for example, the first external electronic device 102 of FIG. 1. The HMD 400 includes a body 402 and a cover 404. The body 402 may include a support 406, two lenses 408 and 410, a coupling unit 412, and a control unit 414.

For example, the electronic device 101 of FIG. 1 can be coupled to the HMD 400. For example, when the electronic device 101, for example a mobile communication device 500, is coupled to the HMD 400, the cover 404 may cover a rear edge of the housing 504 of the mobile communication device 500 when the mobile communication device 500 is inserted so as to be fixed to the head mounted electronic device 400 in order to maintain the coupling state. The support 406 is a member that can be used when the user mounts the head mounted electronic device 400 on the head. The lenses 408 and 410 are installed in locations respectively corresponding to the user's eyes. Each of the lenses 408 and 410 include at least one lens. Each of the lenses 408 and 410 can include a plurality of lenses, such as a micro array lens or a liquid lens. The user, when wearing the HMD 400, will see the physical display screen, for example, the display screen provided through the display 160 of the electronic device 101/mobile communication device 500, through the lenses 408 and 410. The coupling unit 412 is a mechanical structure, which couples the electronic device 101, 500 to the head mounted electronic device 400, for example, to be attachable to and detachable from the electronic device 101, 500.

A control unit 414 is installed in the side or other appropriate location of the body 402. The control unit 414 is used as an input for controlling the HMD device 400 by the user. In various embodiments, the control unit 414 includes at least one of a touch panel, a button, a wheel key, and a touch pad. The touch panel is configured to receive a touch input from the user. The touch input can be a direct touch input on the touch panel or a hovering input activated when, for example, a user finger approaches the touch panel. The HMD 400 may be connected to the electronic device 101, 500 through a communication interface such as a USB to transmit an input received through the control unit to the electronic device 101, 500. The electronic device 101, 500 may control a function corresponding to the input in response to the input received through the control unit 414 of the head mounted electronic device 400. For example, in various embodiments, the electronic device 101, 500 controls a volume or an image reproduction in response to the received input.

Referring to FIG. 5, the electronic device 400 is the HMD of FIG. 4, and the electronic device 500 is, for example, the electronic device 101 of FIG. 1.

The electronic device 500 is coupled to the coupling portion 412, or in some embodiments inserted into a slot or opening of the coupling portion 412 of FIG. 4 of the HMD 400 such that the front surface of the electronic device 500, in which a physical display 502 is installed faces the lenses 408 and 410 of the HMD 400 of FIG. 4. The housing 504 of the electronic device 500 is covered with the cover 404 to be fixed in place within the slot or opening of the HMD 400. The physical display 502 can include displays corresponding to the number of physical lenses 408 and 410 of FIG. 4 or divide a single display screen into screens corresponding to the number of logical lenses and display the screens.

Figure 6:
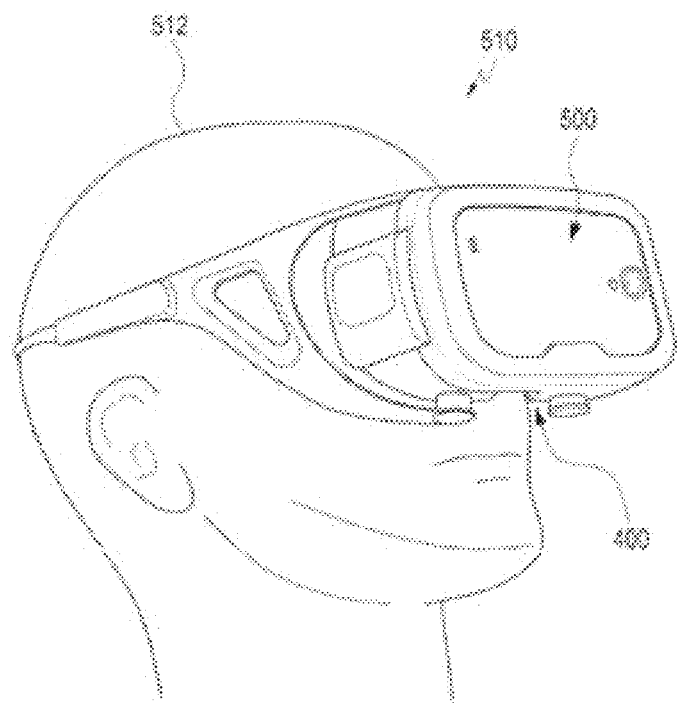
FIG. 6 is a perspective view illustrating an example in which a user wears an electronic device in which electronic devices are coupled according to various embodiments of the present disclosure.

FIG. 6 is a perspective view illustrating an example in which a user wears an HMD 400 in which the mobile device 500 is coupled with the HMD 400 according to various embodiments of the present disclosure. The example shown in FIG. 6 is for illustration and other example configurations may be employed or demonstrated without departing from the scope of this disclosure.

Referring to FIG. 6, a user 512 may wear a combination electronic device 510 on the head. The combination electronic device 510 includes the HMD 400 and the mobile communication device 500. The HMD 400 and mobile communication device are coupled physically and in data communication via wired or wireless communication with each other. The user 512 may see a screen image generated according to an image displayed on the physical display 502 of the mobile communication device 500 through lenses of the electronic device 400, for example, through the lenses 408 and 410 of FIG. 4.

Figure 7:
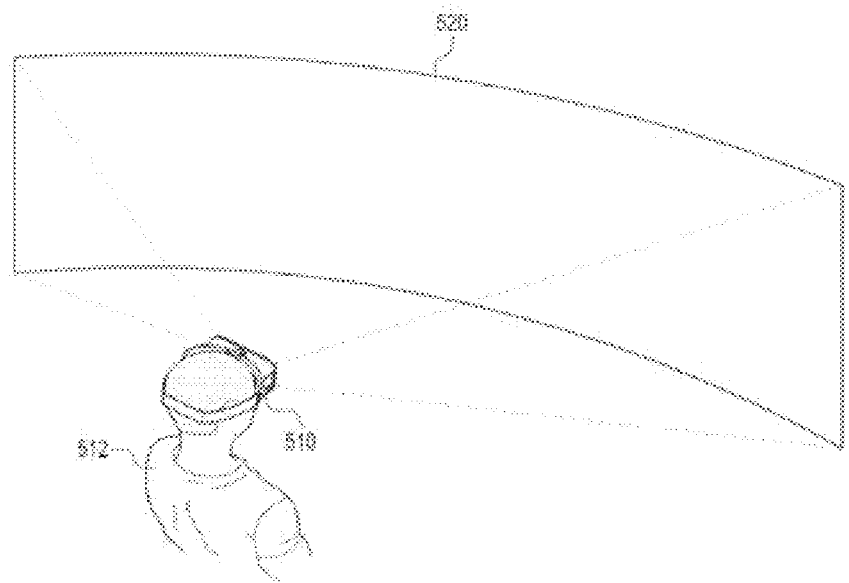
FIG. 7 is a perspective view illustrating an example in which a screen is provided to a user wearing an electronic device in which electronic devices are coupled according to various embodiments of the present disclosure.

FIG. 7 is a perspective view illustrating an example of a screen provided for view by a user wearing an electronic device, such as the combination electronic device 510 in which electronic devices, for example the HMD 400 and the mobile communication device 500, are coupled according to various embodiments of the present disclosure. The example shown in FIG. 7 is for illustration and other example configurations may be employed or demonstrated without departing from the scope of this disclosure.

Referring to FIG. 7, the user 512 wearing the coupled electronic device 510 sees a screen 520 through the coupled electronic device 510. The screen 520 may actually be created by a stereoscopic display or split screen having a first and second screen displayed next to each other in landscape or horizontal mode on the mobile device such that there is one screen positioned in front of each of the user's eyes. The combination of the first screen and second screen next to each other in landscape mode create a single stereoscopic or 3D VR image perceived by the user on the screen 520.

Figure 8:
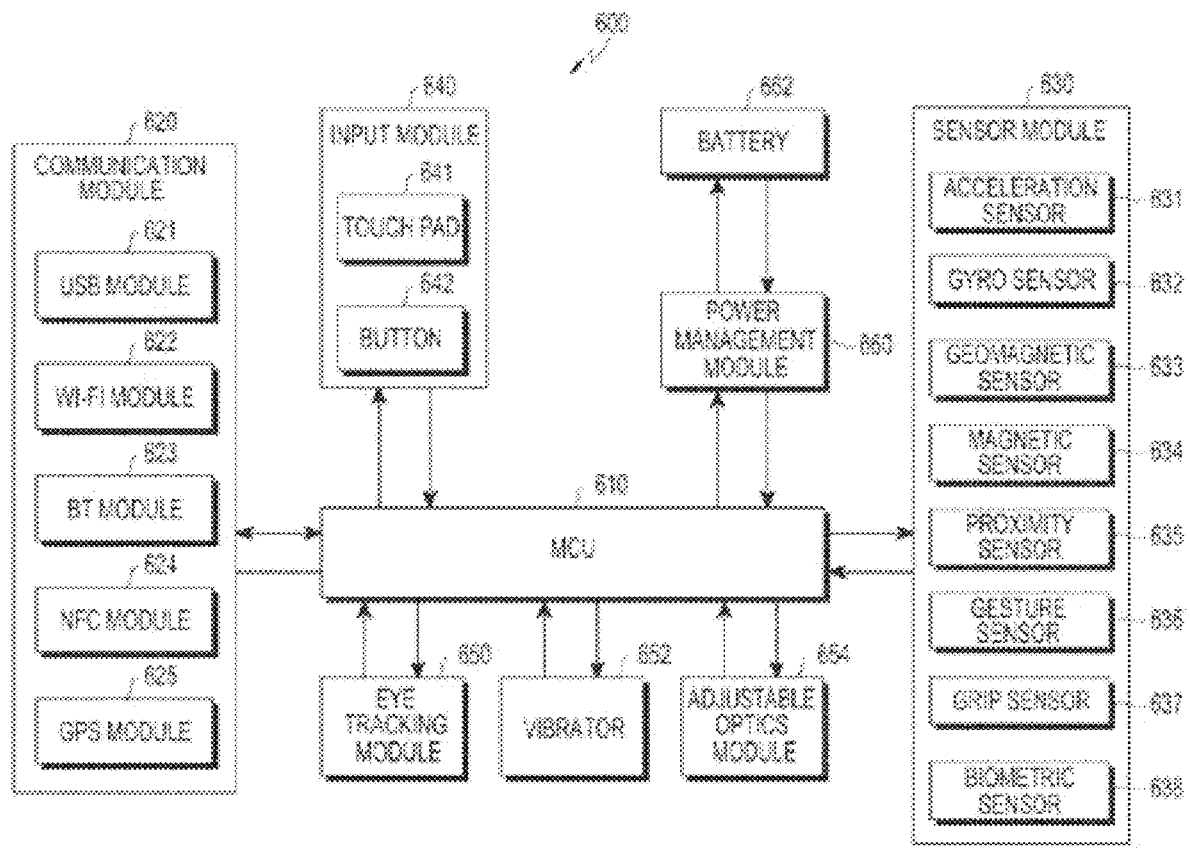
FIG. 8 is a block diagram illustrating an example of a configuration of a head mounted electronic device according to various embodiments of the present disclosure.

FIG. 8 is a block diagram illustrating an example of a configuration of a head mounted electronic device 600 according to various embodiments of the present disclosure and in which embodiments of the present disclosure may be implemented. The embodiment of the head mounted electronic device 600 illustrated in FIG. 8 is for illustration only, the head mounted display device 600 comes in a wide variety of configurations and the block diagram of FIG. 8 does not limit the scope of this disclosure to any particular implementation of a head mounted display device.

Referring to FIG. 8, a head mounted electronic device 600 can be, for example, the HMD 400 of FIG. 4. One embodiment of the head mounted electronic device 600 includes one or more of a micro controller unit (MCU) 610, a communication module 620, a sensor module 630, an input module 640, an eye tracking module 650, a vibrator 652, an adjustable optics module 654, a power management module 660, and a battery 662.

The MCU 610 controls other elements in the head mounted electronic device such as for example, the communication module 620, the sensor module 630, the input module 640, the eye tracking module 650, the vibrator 652, the adjustable optics module 654, and the power management module 660 by driving an OS and/or utilizing the instructions of an embedded software program. In various embodiments, the MCU 610 is referred to as a controller and/or can include a controller as a part thereof, or constitute a part of the controller. The MCU 610 includes at least one processor. In some embodiments the MCU 610 further includes a memory.

The communication module 620 electrically connects the head mounted electronic device 600 to, for example, the electronic device/mobile communication device 500 of FIGS. 5 and 6 through wired communication or wireless communication in order to perform data transmission and reception there between. According to an embodiment of the present disclosure, the communication module 620 includes a USB module 621, a Wi-Fi module 622, a BT module 623, an NFC module 624, and a GPS module 625. According to an embodiment of the present disclosure, at least two of the USB module 621, the Wi-Fi module 622, the BT module 623, the NFC module 624, and the GPS module 625 are included within one IC or IC package.

The sensor module 630 measures a physical quantity or senses an operational state of the head mounted electronic device 600 and converts the measured or sensed information to an electrical signal. The sensor module 630 includes at least one of an acceleration sensor 631, a gyro sensor 632, a geomagnetic sensor 633, a magnetic sensor 634, a proximity sensor 635, a gesture sensor 636, a grip sensor 637, and a biometric sensor 638. The head mounted electronic device 600 detects movement of the user's head wearing the head mounted electronic device 600 by using at least one of the acceleration sensor 631, the gyro sensor 632, and the geomagnetic sensor 633.

The head mounted electronic device 600 detects whether the head mounted electronic device 600 is being worn by using the proximity sensor 635 or the grip sensor 637. According to an embodiment of the present disclosure, the head mounted electronic device 600 detects whether the user wears the head mounted electronic device 600 by detecting at least one of IR recognition, pressure recognition, and a change in capacitance or dielectric constant according to the wearing of the head mounted electronic device 600 by the user. The gesture sensor 636 detects movement of a user's hand or finger and receives the movement as an input operation of the head mounted electronic device 600. Additionally or alternatively, the sensor module 630 can include, for example, a biometric recognition sensor such as an E-nose sensor, an EMG sensor, an EEG sensor, an ECG sensor, an iris sensor, and a fingerprint sensor, and can recognize user's biometric information by using the biometric recognition sensor. The sensor module 630 further can include a control circuit for controlling one or more sensors included therein.

The input module 640 can be, for example, the control unit 414 of FIG. 4. The input module 640 receives an input from the user. The input module 640 includes a touch pad 641 and a button 642. The touch pad 641 recognizes a touch input in at least one of, for example, a capacitive type, a resistive type, an IR type, and an ultrasonic wave type. The touch pad 641 further includes a control circuit. A capacitive touch pad recognizes a physical contact or proximity. The touch pad 641 further includes a tactile layer. In this case, the touch pad 641 provides a user with a tactile reaction. The key 642 include, for example, a physical button, an optical key, or a keypad.

The power management module 660 manages power of the head mounted electronic device 600. Although not specifically illustrated, the power management module 660 can include, for example, a PMIC, a charger IC, or a battery gauge. The PMIC uses a wired and/or wireless charging method. Examples of the wireless charging method include, for example, a magnetic resonance method, a magnetic induction method, an electromagnetic method, and the like. Additional circuits such as for example, a coil loop, a resonance circuit, or a rectifier for wireless charging may be further included. The battery gauge measures, for example, a residual power level quantity of the battery 662, a voltage, a current, and/or a battery temperature while charging. The battery 662 may include, for example, a rechargeable battery or a solar battery.

The eye tracking module 650 tracks a user's line of sight by using at least one type of sensor or eye tracking device such as, for example, an electrical oculography (EOG) sensor, a coil system, a dual Purkinje system, a bright pupil system, and a dark pupil system. Further, in some embodiments, the eye tracking module 650 further includes a micro camera for tracking the user's line of sight.

The adjustable optics module 654 measures an inter-pupil distance (IPD) of the user to allow the user to view an image suitable for the user's eye sight. The head mounted electronic device 600 can adjust a distance between lenses according to the IPD of the user measured through the adjustable optics module 654. The head mounted electronic device 600 transmits the IPD of the user measured through the adjustable optics module 654 to the electronic device 500 and controls a display location on the screen of the display 502 of the electronic device 500.

When the head mounted electronic device 600 moves, for example with the user's head movements, the MCU 610 transfers a value of the movement detected through a motion sensor of the sensor module 630 to the electronic device/mobile communication device 500. In various embodiments, the motion sensor can be at least one of the acceleration sensor 631, the gyro sensor 632, and the geomagnetic sensor 633.

Figure 9:
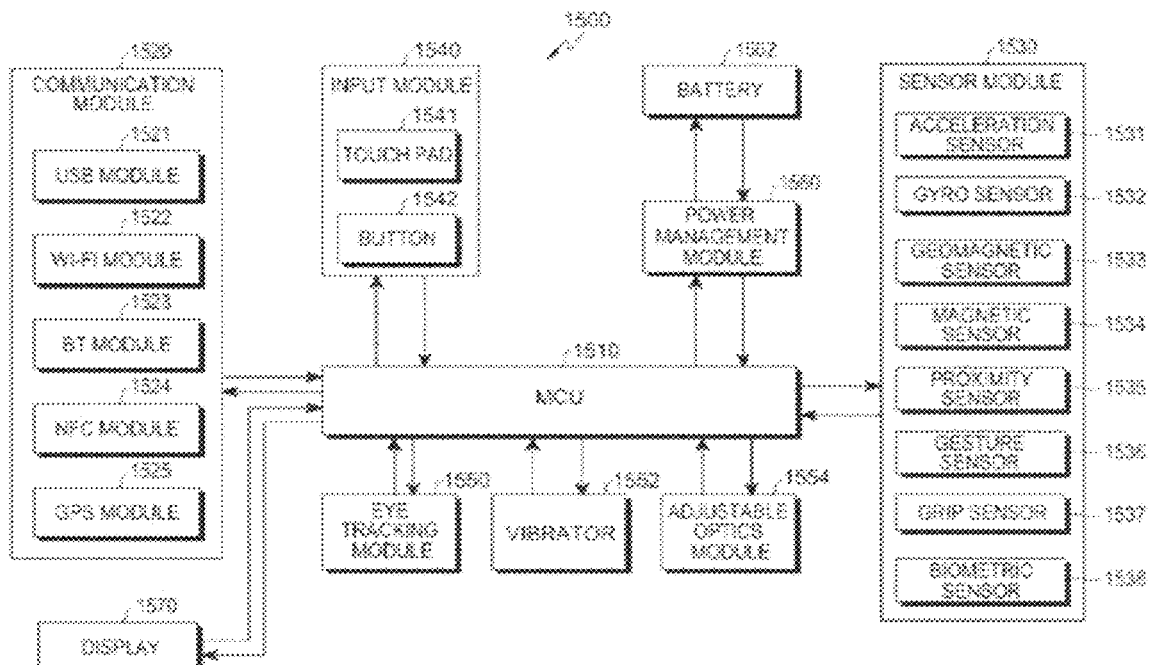
FIG. 9 is a block diagram illustrating an example of a configuration of a head mounted electronic device according to various embodiments of the present disclosure.

Referring to FIG. 9, in some embodiments a head mounted electronic device 1500 is used independently from the electronic device/mobile communication device 500. The head mounted electrical device 1500 in such embodiments provides the user with a virtual screen in an equal or similar manner as the HMD of, for example FIG. 6. Here, the head mounted electronic device 1500 includes an MCU 1510, a communication module 1520, a sensor module 1530, an input module 1540, an eye tracking module 1550, a vibrator 1552, an adjustable optics module 1554, a power management module 1560, a battery 1562, and a display 1570.

The MCU 1510, the communication module 1520, the sensor module 1530, the input module 1540, the eye tracking module 1550, the vibrator 1552, the adjustable optics module 1554, the power management module 1560, and the battery 1562 may be equally or similarly configured to, for example, the MCU 610, the communication module 620, the sensor module 630, input module 640, the eye tracking module 650, the vibrator 652, the adjustable optics module 654, the power management module 660, and the battery 662 of the head mounted electronic device 600 of FIG. 8, respectively.

The communication module 1520 includes, for example, a USB module 1521, a Wi-Fi module 1522, a BT module 1523, an NFC module 1524, and a GPS module 1525. The USB module 1521, the Wi-Fi module 1522, the BT module 1523, the NFC module 1524, and the GPS module 1525 may be equally or similarly configured to, for example, the USB module 621, the Wi-Fi module 622, the BT module 623, the NFC module 624, and the GPS module 625 of FIG. 8, respectively.

The sensor module 1530 includes at least one of, for example, an acceleration sensor 1531, a gyro sensor 1532, a geomagnetic sensor 1533, a magnetic sensor 1534, a proximity sensor 1535, a gesture sensor 1536, a grip sensor 1537, and a biometric sensor 1538. The acceleration sensor 1531, the gyro sensor 1532, the geomagnetic sensor 1533, the magnetic sensor 1534, the proximity sensor 1535, the gesture sensor 1536, the grip sensor 1537, and the biometric sensor 1538 can be equally or similarly configured to, for example, the acceleration sensor 631, the gyro sensor 632, the geomagnetic sensor 633, the magnetic sensor 634, the proximity sensor 635, the gesture sensor 636, the grip sensor 637, and the biometric sensor 638 of FIG. 8, respectively.

The input module 1540 includes a touch pad 1541 and a button 1542. The touch pad 1541 and the button 1542 can be equally or similarly configured to, for example, the touch pad 641 and the button 642 of FIG. 8, respectively.

Descriptions that overlap the description made with reference to FIG. 8 will be omitted in this description of FIG. 9.

In various embodiments, the head mounted electronic device 1500 includes, for example, a physical display 1570 that is installed to be fixed to the body 402 of FIG. 4, instead of having a structure in which the electronic device/mobile communication device 500 is removably coupled to the head mounted electronic device 400. The physical display 1570 is installed in the body 402 to provide a screen viewable by the user through, for example, the lenses 408 and 410 of FIG. 4, instead of using the physical display of the electronic device/mobile communication device 500. In some embodiments, the display 1570 includes displays corresponding to the number of physical lenses, for example, the lenses 408 and 410 of FIG. 4. In other embodiments, a single display screed is divided screen into screens corresponding to the number of logical lenses used to view the display screens.

In other embodiments, the electronic device 1500 may be an electronic device coupled to a head mounted electronic device that is attachable to and detachable from the head mounted electronic device in order to provide a screen for displaying the image. In yet other embodiments, the electronic device 1500 corresponds to a head mounted electronic device.

The term "module" used in various embodiments of the present disclosure refers to, for example, a "unit" including one of hardware, software, and firmware, or a combination of two or more of the hardware, software, and firmware. The term "module" can be interchangeable with a term, such as a unit, logic, a logical block, a component, or a circuit. A "module" may be a minimum unit of an integrated component element or a part thereof. A "module" may be a minimum unit for performing one or more functions or a part thereof. A "module" may be mechanically or electronically implemented. For example, a "module" according to various embodiments of the present disclosure may include at least one of an application-specific IC (ASIC) chip, a field-programmable gate arrays (FPGAs), and a programmable-logic device for performing operations which have been known or are to be developed hereafter.

According to various embodiments of the present disclosure, at least a part of a device, such as for example, modules or functions thereof or a method, such as for example, operations according to the various embodiments of the present disclosure may be embodied by, for example, a command or instruction stored in a computer readable storage medium in a form of a programming module, a program application, an application or app. When an instruction is executed by one or more processors, such as for example, the processor 120 or a processor that may be included in each of the MCUs 610, 1510, the one or more processors perform a function corresponding to the instruction. The computer-readable storage medium may be for example, the memory 130 or a memory that may be included in each of the MCUs 610, 1510. At least a part of the programming module may, for example, be implemented, or executed by a processor. At least some of the programming modules may include, for example, a module, a program, a service application, a mobile application, an application, an app, a routine, a set of instructions, or a process for performing one or more functions.

The computer readable storage or recording medium can include magnetic media, such as a hard disk, a floppy disk and a magnetic tape, optical media, such as a compact disc ROM (CD-ROM) and a DVD, magneto-optical media, such as a floptical disk, and a hardware device specially configured to store and execute a program instruction, for example a programming module, such as a ROM, a RAM, a flash memory, and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or a programming module according to the present disclosure includes at least one of the described component elements, a few of the component elements may be omitted, or additional component elements may be included. Operations executed by a module, a programming module, or other component elements according to various embodiments of the present disclosure can be executed sequentially, in parallel, repeatedly, or in a heuristic manner. Further, some operations are executed according to another order or may be omitted, and/or other operations may be added.

In various embodiments of the present disclosure, a user of a virtual reality (VR) device, alternatively, referred to as a head mount display (HMD) or VR headset, may want to use their mobile communication device, also referred to as a mobile phone or mobile device, without removing the VR headset from their head. The user may want to seamlessly switch between the VR world and the real world or other devices. For example, the user may be watching a movie using their VR headset, but then may want to write an email without removing their VR headset. In such a case, the user will want to be able to view images of user interfaces and/or contents of applications or mobile apps available on the mobile phone in the 3D VR environment.

In various embodiments, a VR device is provided by a combining a mobile communication device, such as a mobile device 500 and a HMD 400 that can be worn on a user's head. Such a mobile device 500 is inserted into the frame or body 402 of the HMD 400, and the physical display screen 502 of the mobile device 500 is used as a display of the VR device/HMD. This type of HMD can be referred to as "drop-in type VR device." In such implementations, computing resources of the mobile device 500 are used to render a VR image or environment, while the body of the HMD may have a limited input mechanism, such a touchpad and/or a button. In other embodiments, a separate hand-held controller is wirelessly or electrically connected to such a HMD. For more details, refer to the above discussed FIG. 1 through FIG. 8.

In some embodiments, the computing power and resources of a mobile device in combination with a drop-in type HMD may not have a full capacity and performance available from a standalone VR HMD device tethered to a conventional personal computer. Additionally, while wearing and using a in a drop-in type HMD, a user may desire to run a mobile application program (also referred to as a "mobile app", or "mobile application"), such as a messaging application, an email application, or video player application, that is installed on the mobile device. Various types of mobile applications can be downloaded from a phone manufacturer's server or an application store of an OS provider. As such, various embodiments of the present disclosure are configured to increase the efficiency of the computing power and resources of the mobile device to provide a satisfactory user experience when combined with a drop-in type HMD. In some embodiments, the computing efficiency of a mobile device is increased with implementation of one or more hardware composers and related buffers and/or memory that assist processors and GPUs in rendering 2D and 3D images.

In one aspect of an embodiment, a VR application program is installed and stored in the non-volatile memory of the mobile device. Embodiments of the VR application enable a user to operate unmodified 2D mobile apps, for example, ANDROID apps or other mobile apps, in a virtual reality environment without removing the VR headset. In order to accomplish this, a 2D graphic image, for example a 2D graphic user interface, that is substantially identical to the 2D graphic user interface image displayed on the mobile device, is provided in a window that is over or part of the 3D image displayed in the 3D VR environment viewed in the VR headset.

In another aspect of an embodiment the VR application program redirects graphic content from the main logical display of a mobile device to a virtual display established within a volatile memory in the mobile device 500. The virtual display is not viewable by a user, but instead is a buffer memory that stores the graphic data of, for example, the user interface (UI) that would normally be displayed on the physical display of the mobile device when the mobile device is operating as only a mobile device and not part of a VR headset. In various embodiments, the graphic data on the virtual display can be dynamically rotated, for example vertically viewed or horizontally viewed, within the virtual display.

Figure 10:
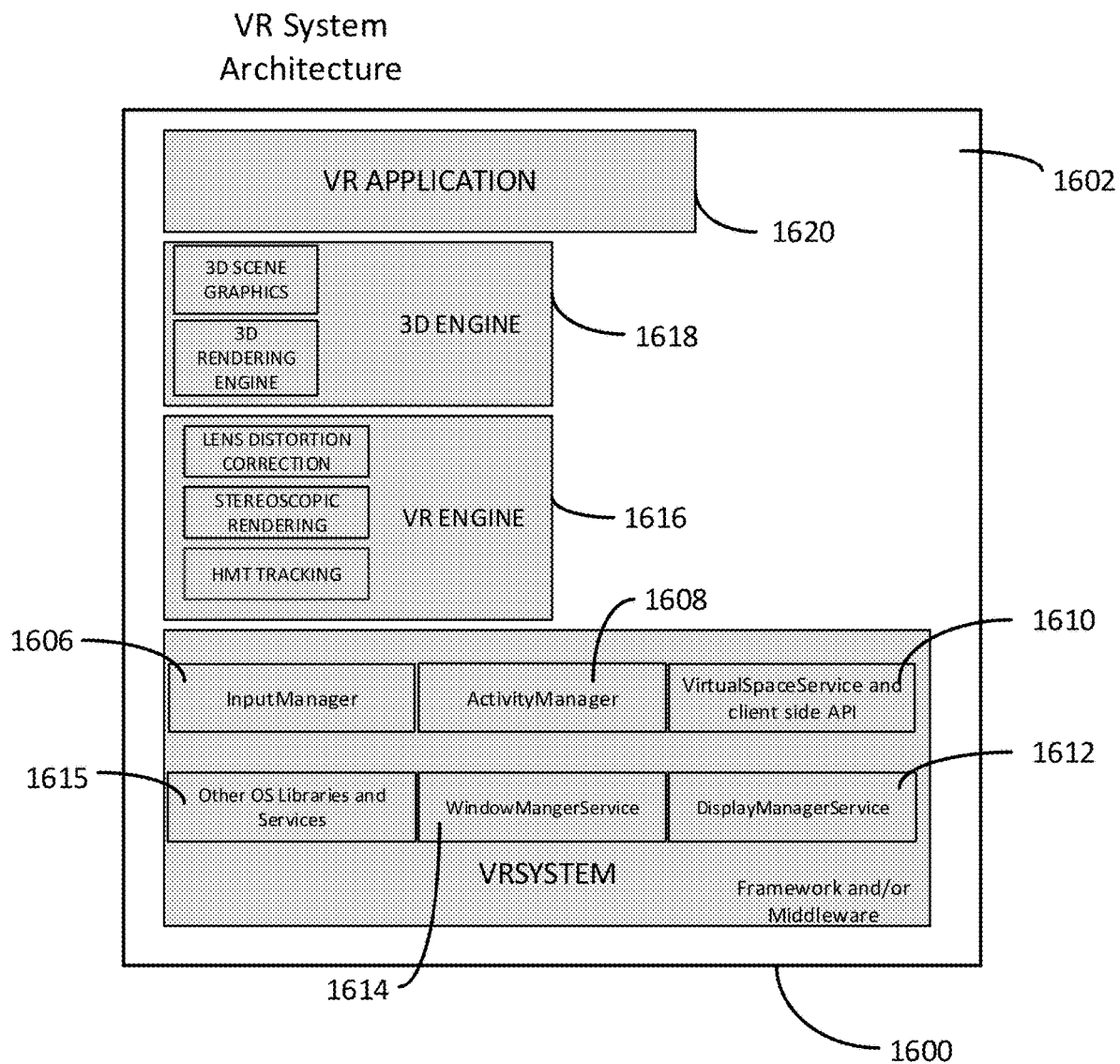
FIG. 10 illustrates an example of virtual reality architecture modules in an electronic device according to various embodiments of this disclosure.

FIG. 10 shows one embodiment of VR system architecture modules that can be included in a program module 300 in a mobile device in accordance with the disclosure. In FIG.

10, the VR system modules, programs or applications 1602 are stored in a memory 1600, for example, memory 130, of an electronic device 101. Framework programs that are part of the electronic device's system are often referred to as management, middle ware, service applications or modules. The framework block 1604 shows an example of framework modules utilized in, for example ANDROID OS based electronic devices. Here the framework block 1604 depicts examples of modules that are used in 2D and 3D graphic and VR processes. Such modules include an input manager 1606, an activity manger service 1608, a virtualspace manger 1610, a display manger service 1612, and a window manager service 1614. Other ANDROID libraries and services 1615 are also associated with the framework block of programs 1604 as discussed above in FIGS. 1, 2 and 3.

The VR Engine block 1616 includes lens distortion correction, head-mounted tracking (HMT) and stereoscopic rendering modules and instructions. The VR engine block also includes application interfaces (APIs) for, among other things, utilizing left and right display images and displaying the left and right images appropriately on a physical display in the VR headset. The 3D Engine block 1618 interfaces with the VR Engine block 1616 via APIs and provides modules used by one or more processors in the electronic device for rendering 3D images and providing 3D scene graphics in the rendered 3D images.

The VR application block 1620 constructs the VR background, menus, and surface/geometry that are to be displayed by, for example a VR game, scene application, or in various embodiments, a 2D mobile application that is being displayed in the VR environment. The VR app 1620 communicates with the 3D engine block 1618, VR engine 1616 and the framework modules 1604 in order to display, for example, a user selected mobile application or 3D application in the VR environment.

In one embodiment, the VR application 1620 includes 3D VR instructions that enable a processor to display the selected 3D application graphic output on the main physical and logical display, for example when the mobile device is operating as part of a HMD, while the normal main logical display 2D graphic image output is redirected to a virtual display in volatile memory. In this situation, a texture stream output of the virtual display is directed to be rendered in the VR scene graphics module of the 3D engine 1618 by VR application 1620 so as to become part of the 3D VR graphic image. The VR application 1620 is executed and creates the VR graphic image in a separate logical display (for example, logical display X), other than the main logical display, then redirects the rendered 3D image that includes at least part of the 2D graphic image to the physical display device.

Various embodiments that are configured to process the 3D VR instructions of the VR application can utilize 2D graphic data. The 2D graphic data in the virtual display is rendered with, for example a 3D graphic background so that the 2D graphic data becomes a window in or over the VR screen background image viewed in the VR environment such that the VR screen includes in its VR screen image a graphic image or images, such as for example, applications, launchers, notifications, status bars, system windows, video clips or the like that are normally displayed or shown on the main 2D display of a mobile device when it is not operating in a VR mode with a HMD. In addition, the rendered 2d graphic in the virtual screen image can still be dynamically rotated as if the mobile device is being rotated from a horizontal to a vertical view and back again. Also, if the 2D graphic user initiated GUI includes a keyboard, by using the virtual display, the VR application supports showing a virtual keyboard as part of the VR screen image when it is displayed on the virtual screen. See for example, FIG. 15A. Moreover, the operating environment that the mobile apps run in prior to being displayed, is unaffected on the mobile device because the mobile apps, while being executed are not aware that their user interface is not being displayed on the main display as a 2D graphic image, but instead is being displayed on a virtual display in volatile memory and then used by the VR application to be incorporated into the VR screen image when the main display is operating as the display for the VR environment.

Additionally, in various embodiments, the VR application is detached from and runs separately from the 2D mobile app. Thus, the 2D mobile app, at runtime, runs as it would normally run in the OS framework modules. For example, when a mobile app queries display characteristics, from the mobile app's standpoint, it's running on and providing its 2D graphic user interface (GUI) to the same 2D display with the same resolution, size, density, as it would normally do regardless of whether the 2D GUI is provided normally to the physical display or provided to the virtual display in volatile memory. The re-routing of the 2D GUI graphic data and other changes made by the VR application occur after the 2D GUI graphic data are created by the 2D application and displayed on the virtual display. Such re-routing does not affect the 2D mobile app's normal instructions execution. As such, various embodiments ensure a highly compatible VR environment where 2D mobile apps can be viewed.

Figure 11:
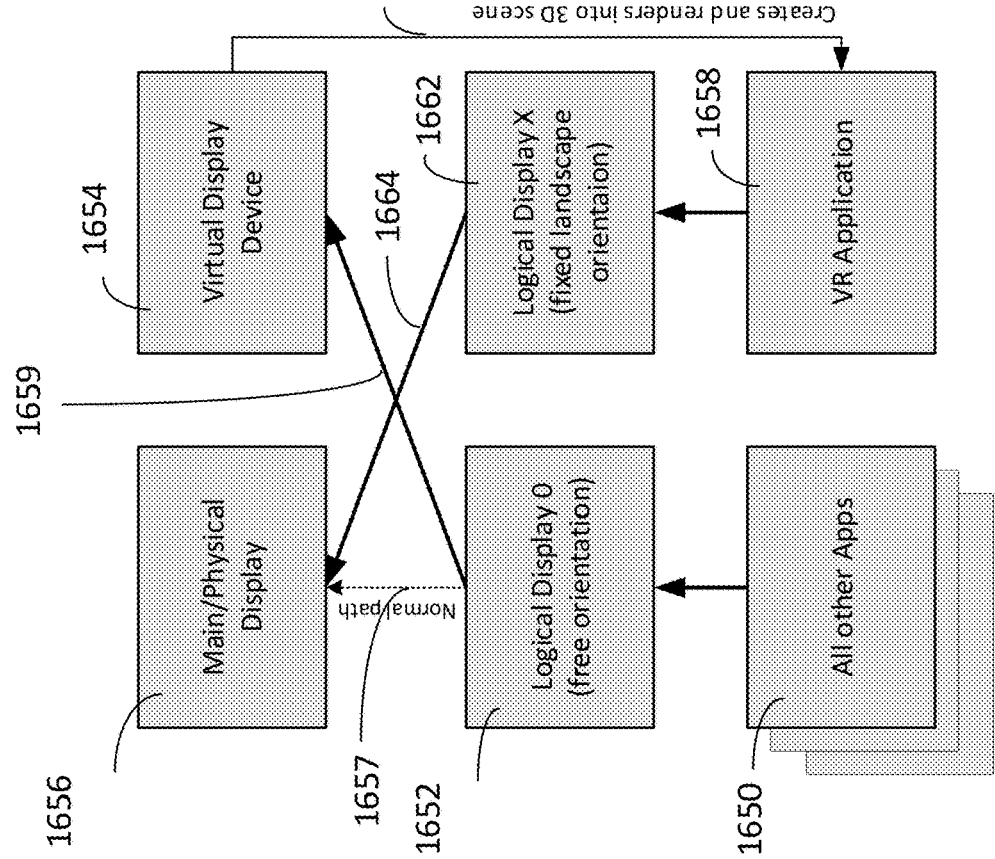
FIG. 11 illustrates a flow diagram of an example display redirection of a logical 0 or main display to a virtual display according to various embodiments of this disclosure.

FIG. 11 provides a flow diagram of an embodiment of display redirection of the logical display 0 1652 being redirected to the virtual display 1654 in volatile memory. Here the 2D main display graphics from the logical display 0 1652 are rerouted to a virtual display 1654, instead of being sent to the physical display 1656. The rerouted 2D main display graphics are rendered into 3D graphics for display in the main/physical display device 1656 when the mobile device is being used in the HMD. In FIG. 11, a plurality of mobile applications 1650 are installed in a non-volatile memory portion, for example, in the application portion 147, 370 of the mobile device. Such mobile applications can include, but are certainly not limited to mobile applications with 2-dimensional (2D) graphic user interfaces that may include, for example, the YOUTUBE app, the GOOGLE PLAY app, the FACEBOOK app, a banking app, an airline travel planning app, a phone dialing app, a game app and/or a text messaging app, just to name a few of the thousands of mobile applications available for download, installation and use on a mobile device. Such mobile applications generally include 2D user interface instructions that when executed by one or more processors in the mobile device provides 2D graphic data for display to the user.

When a user selects a mobile application, such selection is received by one of the processors in the mobile device, for example, processor 120 or application processor 210. When the mobile device is operating in a normal 2D environment, in a first operation, upon execution of the instructions associated with the selected application, the 2D graphic data for display is sent to a main/logical display 0 1652. The graphic data then is sent on a normal path 1657 to the main physical display of the mobile device where the user can view the selected mobile app GUI.

Alternatively, when the mobile device is operating in a 3D VR environment, in a second operation, upon execution of the instructions associated with the selected application, the 2D graphic data for display is sent to the logical display 0 1652, which is an object, and then is redirected 1659 by, in some embodiments, a VR application to a virtual display 1654. The virtual display 1654 is an off-screen, hidden, surface-less display or buffer that, in various embodiments is a dynamic random access memory (DRAM) or other type of volatile memory. The VR application 1658 retrieves 1660 the 2D graphic data from the virtual display 1654 and provides 3D graphic content or image content to logical display X 1662. The VR application 1658 thereby renders 1664 the 2D graphic data content into 3D graphic content viewable by a user in a VR environment and provides the rendered 3D VR image data for display in the physical display device 1656 for view in, for example, a HMD. Logical display 0 1652 is an object that is connected to the physical display device 1656 when the mobile device is operating in the 2D environment and is redirected 1659 to be connected to the virtual display 1654 when the mobile device is operating in the VR environment. Logical display X 1662 is also an object. Logical display X 1662 is connected to the VR application 1658 and is used to render in 3D the graphic data content from the mobile application. In various embodiments, the display manager service application 1612 of the OS framework 1614 manages switching, connecting, and redirecting of graphic data via logical display 0 1652 and logical display X 1662.

In some embodiments a graphics processing unit (GPU) is used to compose and/or render the 2D graphic data for display in the physical display 1656 or the virtual display 1654. In other embodiments, a hardware composer can be used with or without a GPU to compose the different layers of graphics from a plurality of buffers into the rendered 2D graphics displayed in the physical display 1656 or in the virtual display 1654. In yet, other embodiments, the hardware composer can also be used to render the 3D graphics layers for the 3D VR image on the physical display when the mobile device is operating in the 3D VR environment.

The redirection/switching of the routing of the 2D graphic data from going directly to the physical display device 1656 via the normal path 1657 to being redirected 1659 to the virtual display 1654 shown in FIG. 11 allows for dynamic image rotations, for example from portrait mode to landscape mode and vice versa, in the logical display 0 1652 and ultimately within the virtual display 1654. As a result, the 2D graphic image can be shown to dynamically rotate from portrait mode to landscape mode and vice versa when utilized by the VR application 1658 and rendered as at least part of the 3D graphic image displayed in a VR environment on the main physical display 1656. This functionality of being able to dynamically rotate the 2D graphic image or content in the logical display 0 1652 that results in providing portrait and landscape image orientation in the virtual display 1654 prior to being operated on by the VR application makes the VR application 1658 processes transparent to the mobile application processing and enables many 2D graphic oriented mobile applications to be compatibly displayed by embodiments in a VR environment on the main physical display 1656 of the mobile device when operating as part of a HMD.

Figure 12:
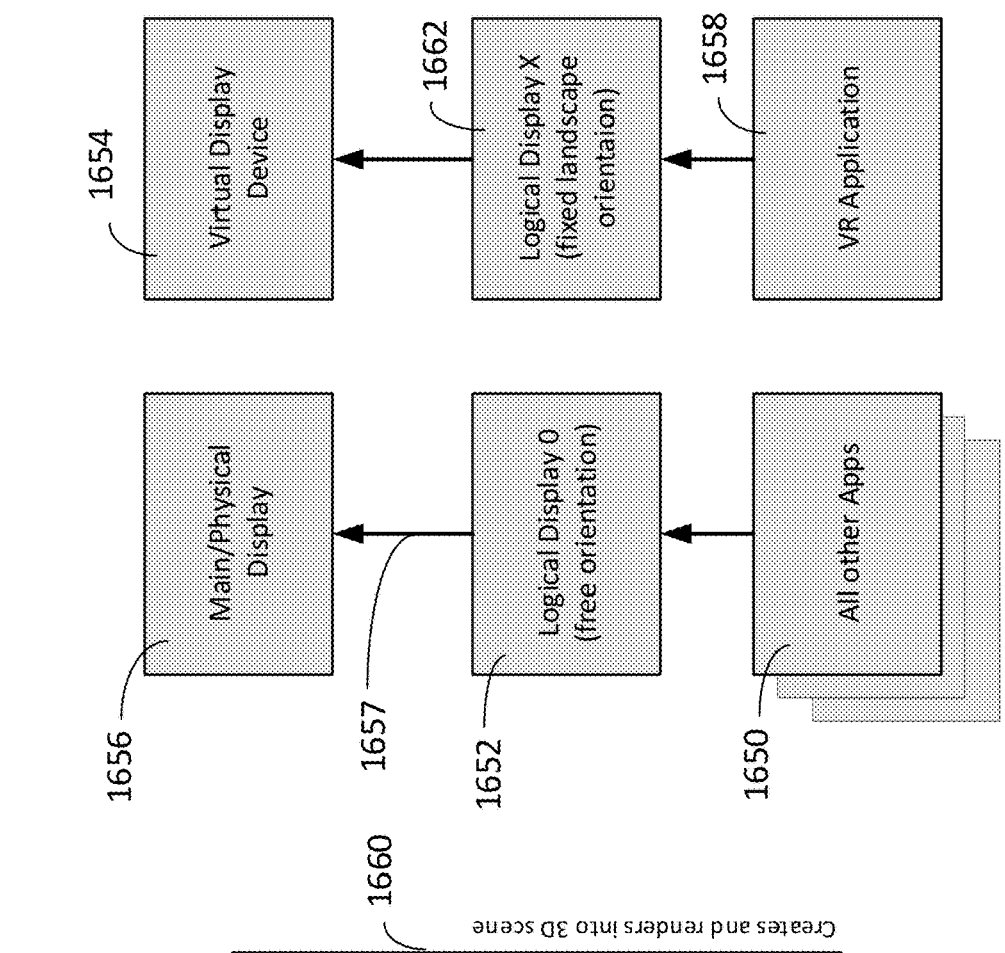
FIG. 12 illustrates a flow diagram of display redirection in, for example a mobile device, at startup in accordance with various embodiments of this disclosure.

FIG. 12 shows a flow diagram embodiment of display redirection, in for example a mobile device, at startup in accordance with an embodiment of this disclosure. FIG. 12 shows a first stage of a main display redirection startup process used prior to obtaining the redirection shown in FIGS. 13 and 14. In FIG. 12, the mobile device is operating in a first or normal 2D physical display operation mode at startup. A user selects, or the mobile device is preset to select, a mobile application from a plurality of mobile applications and or other applications 1650 stored in a non-volatile memory or other non-transitory computer readable medium. The one or more processors in the mobile device execute the instructions provided by the selected mobile application and provide 2D graphic data, for example in the form of layers of a graphic user interface (GUI), to logical display 0 1652. Logical display 0 can be an object that includes a plurality of buffers for holding the one or more of the graphic layers of the GUI. The 2D graphic data is composed and rendered into a 2D graphic image of the GUI and provided 1657 to the physical display 1656 of the mobile device in a manner that is viewable to a user.

Additionally, a second logical display X 1662 is created as, for example, another object. The logical display X 1662 is associated or connected to a virtual display 1654 when display redirection is to occur based on, for example, the mobile device being associated with or inserted into a drop-in type HMD and/or an indication that a VR image needs to be rendered for the HMD headset is received by one of the processors in the mobile device that is executing instructions from the VR Application 1658. The virtual display can be a volatile memory configured to store 2D or 3D graphic images as if such images were being displayed in a physical display. The stored 2D or 3D graphic images in the virtual display 1654 cannot be visually viewed or seen. The VR application 1658 is associated with the logical display X 1662 and with the virtual display 1654. Output from the VR application 1658, for example 3D graphic data or other graphic data, is provided to the virtual display 1654 via the logical display X 1662. The graphic data from the VR application 1658 is not shown or displayed on the physical display device 1656, but instead is rendered and displayed in a non-visible manner in the virtual display 1654 in volatile memory.

Figures 13, 14:
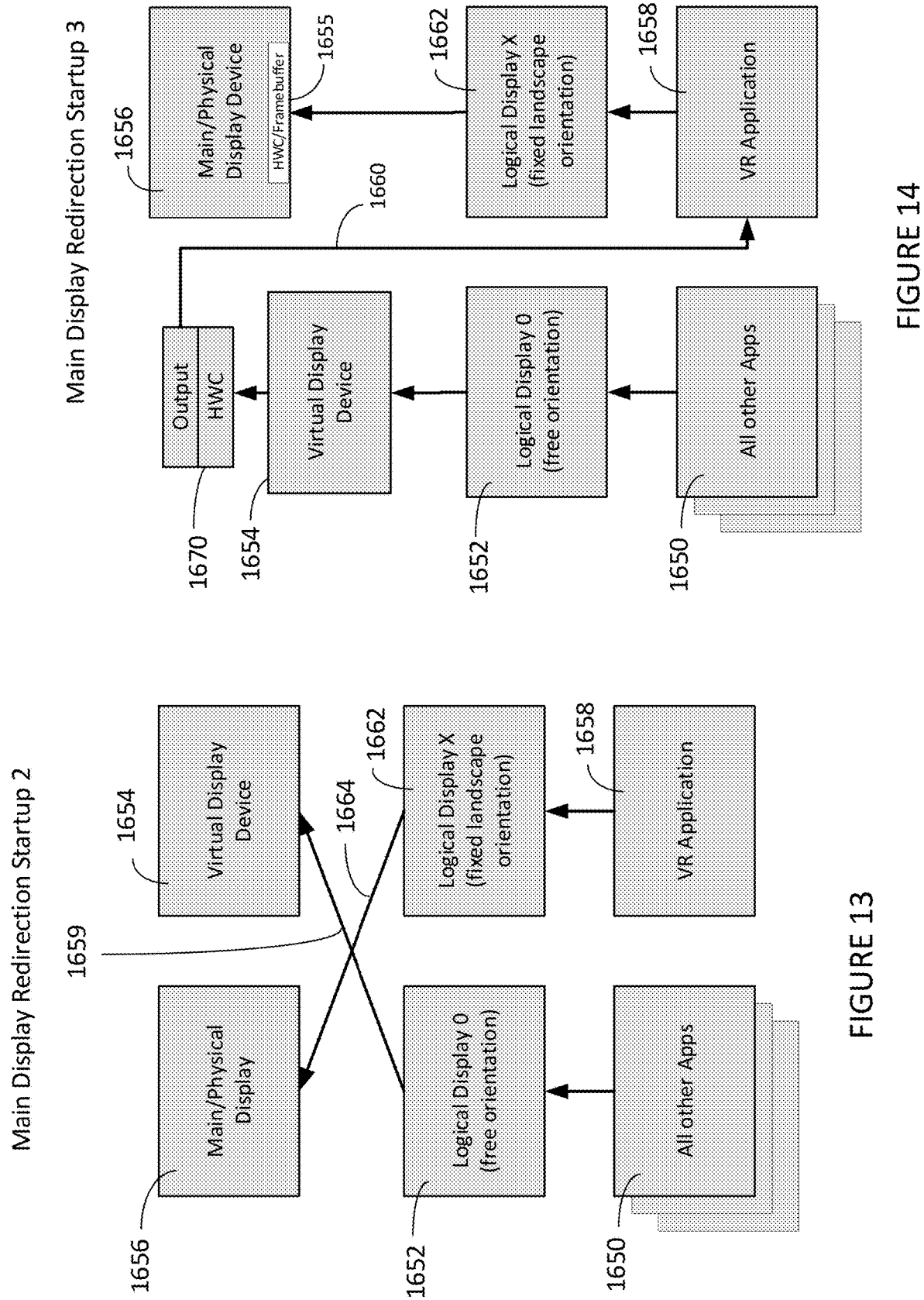
FIG. 13 illustrates a flow diagram of display redirection in, for example a mobile device at or after startup when in communication with a VR device in accordance with various embodiments of this disclosure.
FIG. 14 illustrates a flow diagram of the main display redirection in accordance with various embodiments of this disclosure.

FIG. 13 shows a flow diagram embodiment of display redirection, in for example a mobile device at or after startup when connected or in communication with a VR device such as a HMD 400. In FIG. 13, a second stage of the main display redirection startup is shown wherein the outputs of logical display 0 1652 and logical display X 1662 are switched or redirected. The output from logical display 0 1652 is redirected to the virtual display 1654 and the output of the logical display device X 1662 is redirected to the main physical display device 1656. In this 3D VR environment, the graphic data output from VR application 1658 is displayed in the main physical device 1656 and can be viewed as a 3D graphic image in, for example, the HMD 400. In various embodiments, the display manager service application of the OS Framework, for example the ANDROID operating system framework, is modified in order to allow and or enable the redirection of logical display 0 1652 to the virtual display 1654.

FIG. 14 shows a flow diagram embodiment of the main display redirection in a format that shows a re-alignment of the flow blocks shown in FIG. 11. FIG. 14 provides an embodiment of a third stage of a main display redirection startup process in, for example, a mobile device at or after startup when connected or in communication with a VR device such as HMD 400. In FIG. 14 a hardware composer ("HWC" or "HW composer") 1670 is shown to generate an output from the virtual display 1654. The HW composer 1670 blends the 2D graphic content layers, surfaces or data from the mobile application with other graphic layers or surfaces, such as a status bar and/or a navigation bar to create a composite image output from the virtual display 1654. The composite image output is the 2D GUI or graphic data that is output from HWC associated buffers. The VR application 1658 retrieves 1660 the 2D composite image or graphic data from the virtual display 1654 by way of the HWC 1670 created output. The virtual display's output generated by the HWC is the graphic data or composite image used by the VR application 1658. Via the logical display X 1662 and some processing by a GPU, the HWC 1670 in conjunction with the main display's framebuffer 1655 or other processor renders at least part of the 2D image or graphic data content into a window or portion of a 3D graphic image. The 2D image combined with the 3D graphic image form the complete 3D VR graphic scene that is provided by the main display for visual display in the physical display device 1656. In various embodiments, the main display device's output is the physical display device's framebuffer. Thus, in some embodiments, the HWC and associated buffers is used for both configuring both the 2D composite image output from the virtual display, and the 3D VR graphic scene composite output from the main display device output for the physical display. In one embodiment, the graphic content output from the virtual display 1654 can be scaled down to improve rendering performance for the 3D VR scene displayed in the physical display 1656. In this case, the graphic content output of the virtual display 1654 after composition by, for example, a GPU or HW composer 1670 per instructions in in the VR application 1658, could have a resolution of, for example 1480×720, while if the graphic content from the mobile applications were to be displayed in a normal 2D environment on the main physical display, the resolution can be a higher resolution of, for example 2960×1440 on the physical display 1656.

Various embodiments include added OS system or framework functionality used by the VR application. Such added OS system or framework functionality can be centralized in an application or service, for example, using VirtualSpaceManager. In various embodiments, the VirtualSpaceManager service can provide one or more of the following features. Such features include (a) exposing a client API configured to create and manage multiple virtual display screens that can each virtually display and host activities; (b) securing access to the sensitive OS or framework functionality; (c) allowing the user interface/GUI to be implemented in a regular application (apk); (d) provide the client API in a manner that is not VR specific and that can be used in non VR related applications.

Various embodiments of this disclosure provide main physical display redirection that redirects the graphic content, for example of a mobile application's 2D GUI from being displayed on the full main physical display to being displayed in a virtual display. Such redirection can include routing of touch inputs associated with the 2D GUI to the virtual display.

Various embodiments of this disclosure create one or more virtual screens wherein the graphic data, content or image in the virtual screen in volatile memory can be dynamically rotated in a same manner as a 2D mobile application GUI may be dynamically rotated from portrait mode to landscape mode and vice versa on a main physical display of the electronic device.

Various embodiments include a hardware composer (HWC) as shown in FIG. 1 and FIG. 14. A HWC 125 or HWC 1670 can be a plurality of buffers or memory portions that are configured to interact with the OS, framework applications, and/or the VR application to determine an efficient way to organize the available buffers to compose the layers of graphic data to be incorporated into a resulting graphic image for display. The implementation of an HWC is often device specific and often performed in associated display hardware. A HWC can be used in conjunction with a GPU or separately. The HWC composites multiple buffers together in, for example, the display hardware rather than the same composite of multiple layers being all accomplished by the GPU. For example, consider a mobile device operating in 2D mode and displaying a GUI on the main physical display in portrait orientation, with, for example, a status bar layer on top, a navigation bar layer on the bottom, and the mobile application content layer displayed in between. The contents of each layer are in separate HWC buffers. The HWC passes the layers in from each buffer directly to the physical display hardware or a service application, such as for example DisplayManagerService, and instructs the physical or virtual display read the graphic data layers from the different buffers for placement at the different (top, bottom, middle) of the screen.

Figure 15A:
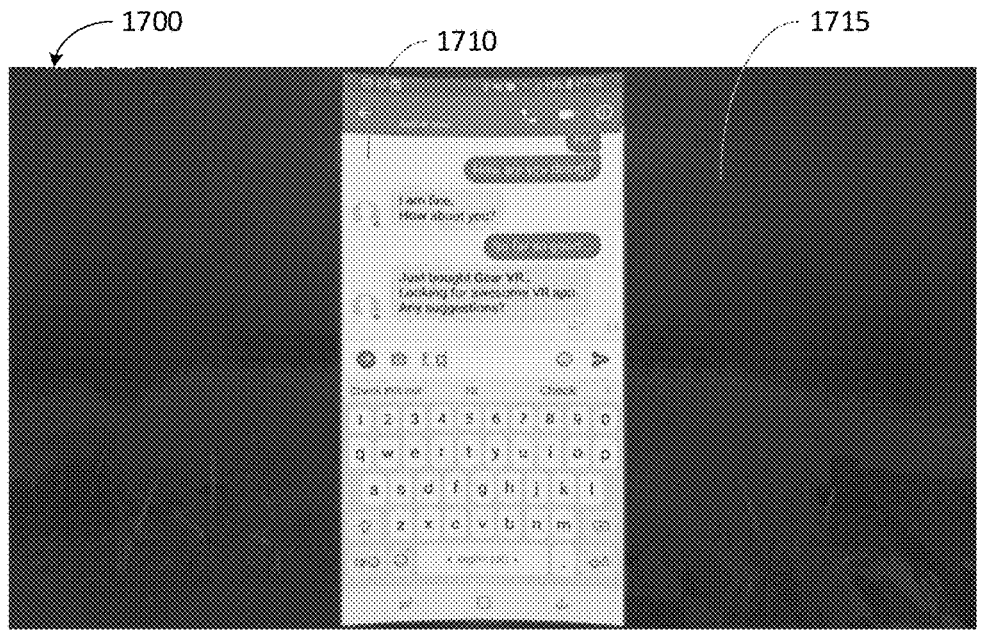
FIGS. 15A, 15B and 15C are examples of 3D VR graphic image or scene views that include a 2D graphic user interface of a mobile application rotated in portrait and/or horizontal view in accordance with various embodiments of this disclosure.
Figure 15B:
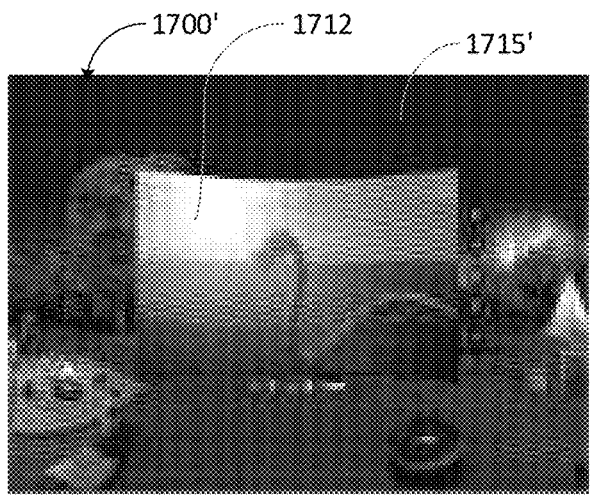
Figure 15C:
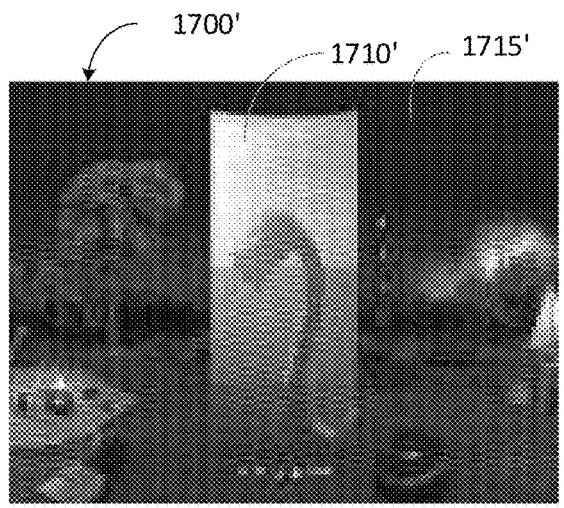

FIGS. 15A, 15B and 15C provide examples of how a user will perceive 3D graphic image views in a 3D VR environment of a 2D GUI rendered as part of the 3D graphic image in accordance with embodiments of the disclosure. It is understood that the actual 3D graphic image is displayed stereoscopically with a split screen having a separate image to be viewed by each of the user's eyes such that the user perceives a single 3D graphic image, such as the examples shown in FIGS. 15A, 15B and 15C. In FIG. 15A a 2D mobile application, for example, a messaging application was selected by a user while the mobile device is operating as a display for a VR environment, for example as part of a HMD. The GUI 1710 of messaging application was provided to the virtual display in volatile memory and then obtained by the VR application. The VR application composites and renders the 3D graphic image 1700 to include a rendition of the 2D messaging application GUI in portrait view 1710 as a window over the VR 3D background 1715, which is a plant and water view background. Thus, a user can now use the same 2D mobile application's GUI, previously only available as a 2D graphic image on the main physical display of the mobile device, while using the mobile device in a 3D VR environment operation. Note that even though the mobile device may be physically installed or inserted in the HMD frame horizontally, the 2D mobile application GUI, for example, the messaging application, can be viewed in portrait view or be rotated into horizontal view (not specifically shown), when horizontal view is also available in the 2D mobile application using VR environment controls UI. FIG. 15 B depicts a 3D graphic VR image 1700' with a 2D graphic user interface rotated in a horizontal view 1712 where a 2D picture or video is playing in a window over the 3D VR background scene 1715'. In FIG. 15C, the 2D graphic user interface is rotated into a portrait view 1710' where the 2D picture or video is playing in a window over the 3D VR background scene 1715' of the entire 3D graphic VR image 1700'.

Figure 16:
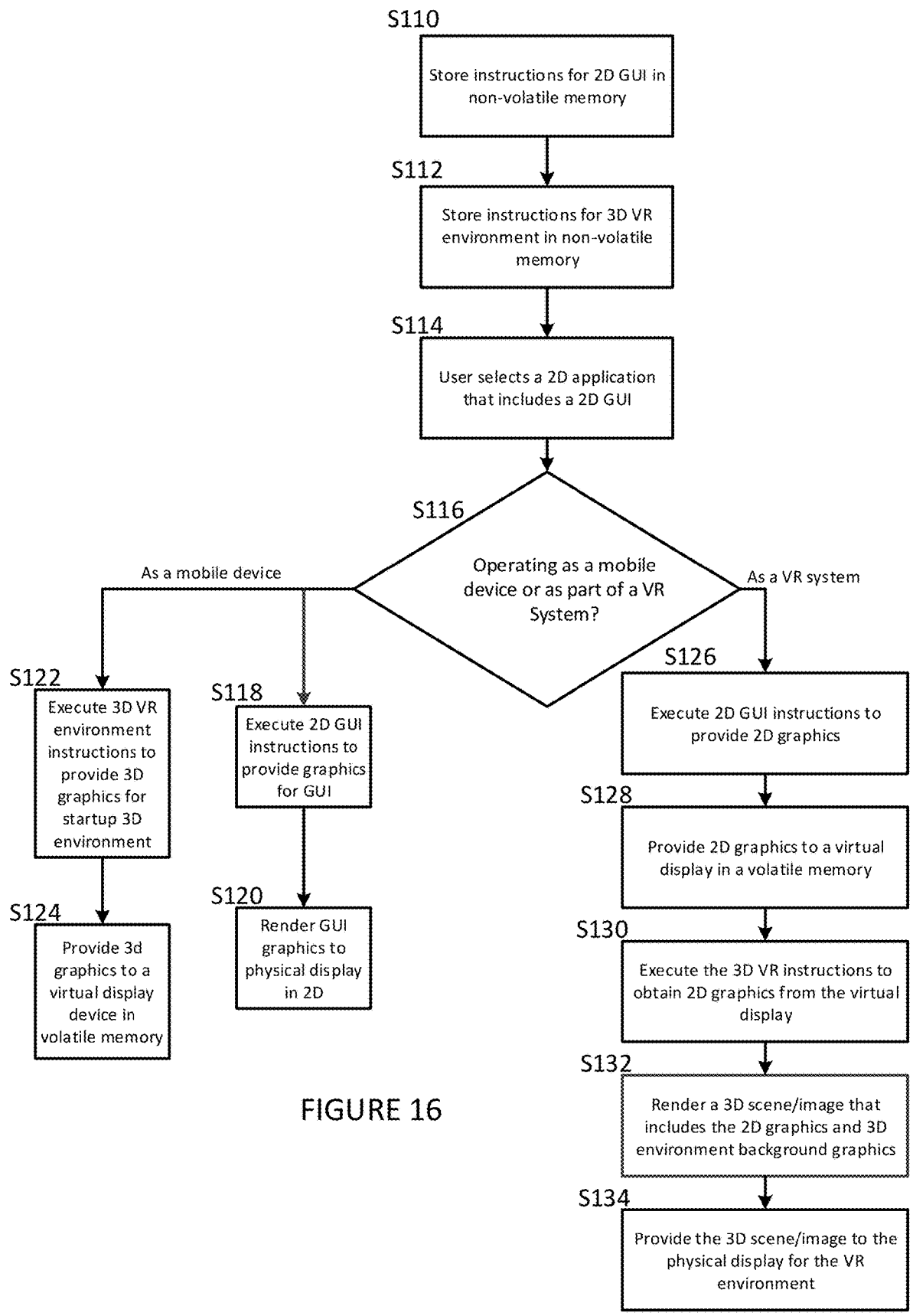
FIG. 16 is a flow chart of a method of redirection in accordance with various embodiments of this disclosure.

FIG. 16 is a flow chart of an embodiment of method of the present disclosure. The embodiment of the method of the present disclosure illustrated in FIG. 16 is for illustration only and does not limit the scope of this disclosure to any particular method. An electronic device, such as for example, a mobile device, includes a housing with a physical display exposed for viewing through a portion of the housing. The electronic device includes at least one processor for processing instructions associated with the OS, framework applications, middleware service applications, 2D and 3D graphics, VR environment related applications, and/or other downloadable or electronic device related applications stored in accessible memory on a program module located on or off the electronic device. The electronic device includes onboard memory that is accessible to the at least one processor. The memory includes both volatile memory and non-volatile memory portions. In various embodiments, a portion of the volatile memory is configured to operate as a virtual display.

At S110, instructions for a 2D graphic user interface (GUI) are stored in the electronic device's non-volatile memory. The instructions, for example can be organized in the form of an application or program that can be executed by at one or more of processors. The 2D GUI is generally a GUI displayed on the 2D physical display of the mobile device, such as, for example, a phone GUI, a messaging GUI, a social network GUI, a weather or news GUI, a game GUI, just to name a few. At S112, instructions for a 3D virtual reality (3D VR) environment and/or user interface are stored in the electronic device's non-volatile memory. The 3D VR instructions, when executed by the one or more processors controls rendering and creation of the VR background, menus and surfaces to be displayed in a VR environment.

At S114, a user selects a 2D GUI application for use on the electronic device. The selected 2D GUI application's associated instructions are executed by the OS. At S116, the OS of the electronic device determines whether the physical display on the device should be operating in a 2D physical display mode or in a 3D VR environment mode, for example as part of or positioned in a HMD. When operating as a mobile device with a 2D physical display, then at S118, the at least one processor executes at least some of the 2D GUI instructions to produce or render a 2D graphic image. At S120, the 2D GUI is provided to and displayed in the physical display. At S122, in various embodiments while operating in 2D display mode, for example during a main display redirection startup wherein the mobile device prepares to operate as part of a 3D VR environment HMD, the OS of the electronic device can cause at least one of processors of the electronic device to execute 3D VR environment instructions to produce 3D graphic data such as VR background graphics, menus and surface/geometry. Such graphic data can include left and right images for potential 3D viewing. At S124, the 3D graphic data is provided to a virtual display located in a volatile memory area of the electronic device.

When at S116, the OS of the electronic device determines that the physical display is operating as part of a VR HMD, then at S126 the OS cause the at least one processor in the electronic device to execute at least some of 2D GUI instructions to produce or render a 2D graphic image from the selected 2D GUI application. At S128, the 2D graphic image or data is provided to the virtual display in volatile memory, which cannot be directly or physically viewed by a user. At S130 the OS executes the 3D VR environment instructions to obtain the 2D graphic data or image from the virtual display. At S130, the 3D VR environment instructions may continue to be executed to obtain the 2D graphic image or data from the virtual display. At S132, the 3D VR instructions are executed by the one or more processors to render a 3D VR image background, menu and/or surface/geometry that includes a window or area within or on top of at least a portion of the 3D image. The window or area includes at least part of the 2D graphic image or data. For example, a 2D phone dialing GUI can be incorporated and rendered as part of the 3D VR image data as a 2D or 3D window or graphic layer. In various embodiments a left and right graphic (one for each of the viewer's eyes) are created or rendered by the 3D VR environment instructions. At S134, execution of the 3D VR instructions result in providing the rendered 3D VR image is provided to and displayed in the physical display of the electronic device. The rendered 3D VR image, for example as shown in FIGS. 15A, B and C as a 2D message GUI or video GUI combined in an embodiment of this disclosure into a 3D VR image as viewed in a HMD device that incorporates an electronic device, such as, for example a mobile device.

None of the description in this application should be read as implying that any particular element, step, or function is an essential element that must be included in the claim scope. The scope of patented subject matter is defined only by the claims. Moreover, to aid the Patent Office and any readers of any patent issued on this application in interpreting the claims appended hereto, applicants wish to note that they do not intend any of the appended claims or claim elements to invoke 35 U.S.C. § 112(f) unless the exact words "means for" or "step for" are explicitly used in the particular claim. Use of any other term, including without limitation "mechanism," "module," "device," "unit," "component," "element," "member," "apparatus," "machine," "system," "processor," "controller," within a claim is understood by the applicants to refer to structures known to those skilled in the relevant art and is not intended to invoke 35 U.S.C. § 112(f).

Although the present disclosure has been described with reference to various embodiments thereof, various changes and modification may be suggested to one skilled in the art. It is intended that the present disclosure encompass such changes and modification as fall with the scope of the appended claims.

What is claimed is:

1. An electronic device comprising:
a housing;
a physical display exposed through a portion of the housing;
at least one processor positioned inside the housing and operatively connected to the physical display;
a volatile memory positioned inside the housing and operatively connected to the at least one processor, wherein the volatile memory includes a virtual display; and
a non-volatile memory positioned inside the housing and operatively connected to the at least one processor, wherein the non-volatile memory is configured to store:
first instructions for generating a 2-dimensional (2D) user interface;
second instructions for generating a 3-dimensional (3D) VR environment; and
system instructions,
wherein in a first operation, the system instructions, when executed, cause the at least one processor to:
execute the first instructions for generating the 2D user interface to cause the at least one processor to provide first graphic data;
provide the first graphic data to the physical display; and
execute the second instructions for generating the 3D VR environment to cause the at least one processor to provide second graphic data to the virtual display provided in the volatile memory, wherein the virtual display is not viewable and is configured to display and dynamically rotate the second graphic data as rendered for the physical display, and
wherein in a second operation, the system instructions, when executed, cause the at least one processor to:
execute the first instructions for generating the 2D user interface to cause the at least one processor to provide the first graphic data;

reroute the first graphic data to the virtual display, wherein the virtual display is configured to store and rotate the first graphic data as rendered for the physical display; and execute the second instructions for generating the 3D VR environment to cause the at least one processor to:

obtain the first graphic data from the virtual display;

render, in the 3D VR environment, at least part of the 2D user interface as a user interface object using the first graphic data; and provide the rendered user interface object, in the 3D VR environment, to the physical display.

2. The electronic device of claim 1, wherein in the first operation, the system instructions, when executed, cause the at least one processor to:

create a first logical display that directs the first graphic data to the physical display; and create a second logical display that directs the second graphic data to the virtual display.

3. The electronic device of claim 2, wherein in the second operation, the system instructions, when executed, cause the at least one processor to:

create the first logical display such that the first logical display directs the first graphic data to the virtual display; and create the second logical display such that the second logical display directs the second graphic data to the physical display.

4. The electronic device of claim 1, wherein in the second operation, the system instructions, when executed, cause the at least one processor to:

receive a selection of a mobile application;

execute the first instructions to cause the at least one processor to generate two or more image layers;

cause a hardware composer to combine the two or more image layers into a composite 2D image; and provide the composite 2D image to the virtual display as the first graphic data.

5. The electronic device of claim 4, wherein in the second operation, the system instructions, when executed, cause the at least one processor to:

execute the second instructions to cause the at least one processor to render the user interface object using at least part of the first graphic data and a background image; and provide the rendered user interface object to the physical display.

6. The electronic device of claim 5, wherein the at least one processor includes an application processor and a graphic processing unit (GPU), wherein the second instructions, when executed, cause the GPU to render the user interface object.

7. The electronic device of claim 6, wherein the application processor is operatively connected to or integrated with the hardware composer and is configured to cause the hardware composer to provide the composite 2D image to the virtual display.

8. The electronic device of claim 1, wherein in the second operation, the system instructions, when executed, further cause the at least one processor to provide the first graphic data to the virtual display and dynamically rotate the first graphic data in the virtual display, wherein the dynamically rotated first graphic data becomes the first graphic data.

9. The electronic device of claim 1, further comprising a head mountable portion that includes a body and a cover; and wherein insertion of the housing into the body causes the at least one processor to launch the second operation.

10. The electronic device of claim 1, wherein the non-volatile memory is further configured to store a plurality of framework programs, wherein the framework programs comprise at least a portion of the system instructions.

11. A method comprising:

displaying data via a physical display for viewing through a portion of a housing;

operatively connecting at least one processor to the physical display;

operatively connecting each of a volatile memory and a non-volatile memory to the at least one processor;

establishing a virtual display;

storing first instructions for generating a 2-dimensional (2D) user interface in the non-volatile memory;

storing second instructions for generating a 3-dimensional (3D) virtual reality (VR) environment in the non-volatile memory; and storing system instructions in the non-volatile memory;

wherein in a first operation, the method further comprises:

providing, by the at least one processor when executing at least some of the first instructions for generating the 2D user interface, first graphic data;

displaying the first graphic data in the physical display; and providing, by the at least one processor when executing at least some of the second instructions for providing the 3D VR environment, second graphic data to the virtual display provided in the volatile memory, wherein the virtual display is not viewable and is configured to display and dynamically rotate the second graphic data as rendered for the physical display, and wherein in a second operation, the method further comprises:

rerouting, by the at least one processor when executing at least some of the first instructions for generating the 2D user interface, the first graphic data to the virtual display, wherein the virtual display is configured to store and rotate the first graphic data as rendered for the physical display;

obtaining, by the at least one processor when executing at least some of the second instructions for generating the 3D VR environment, the first graphic data from the virtual display;

rendering, by the at least one processor when executing at least some of the second instructions for generating the 3D VR environment, in the 3D VR environment, at least part of the 2D user interface as a user interface object using the first graphic data; and providing the rendered user interface object, in the 3D VR environment, to the physical display.

12. The method of claim 11, wherein the method further comprises:

generating, by the at least one processor when executing at least a portion of the system instructions, a first logical display and a second logical display, wherein in the first operation, the method further comprises:

directing the first graphic data from the first logical display to the physical display; and directing the second graphic data from the second logical display to the virtual display.

13. The method of claim 12, wherein in the second operation the method further comprises:

directing the first graphic data from the first logical display to the virtual display; and
directing the second graphic data from the second logical display to the physical display.

14. The method of claim 11, wherein in the second operation the method further comprises:
receiving, by the at least one processor, a selection of a mobile application program;
generating, by the at least one processor when executing at least a portion of the first instructions for generating the 2D user interface, two or more image layers;
combining, by the at least one processor when utilizing a hardware composer, the two or more image layers into a 2D image; and
providing the 2D image as the first graphic data to the virtual display.

15. The method of claim 14, wherein in the second operation the method further comprises:
rendering, by the at least one processor when utilizing the second instructions for generating the 3D VR environment, the user interface object using at least part of the first graphic data from the virtual display and a 3D background image; and
providing the user interface object to the physical display.

16. The method of claim 11, wherein in the second operation the method further comprises: dynamically rotating, by the at least one processor when executing at least a portion of the system instructions, the first graphic data in the virtual display prior to rendering the user interface object using at least part of the first graphic data.

17. The method of claim 11, further comprising inserting the housing in a body of a head mountable portion and causing the at least one processor to launch the second operation.

18. A non-transitory computer readable medium comprising a plurality of system instructions, the plurality of system instructions configured when executed to cause at least one processor of an electronic device to:
establish a virtual display;
store, in a non-volatile memory, first instructions for generating a 2-dimensional (2D) user interface; and
store, in the non-volatile memory, second instructions for generating a 3-dimensional (3D) VR environment,
wherein in a first operation, the system instructions, when executed, cause the at least one processor to:
execute the first instructions for generating the 2D user interface to cause the at least one processor to provide first graphic data;
provide the first graphic data to a physical display; and
execute the second instructions for generating the 3D VR environment to cause the at least one processor to provide second graphic data to the virtual display provided in a volatile memory,
wherein the virtual display is not viewable and is configured display and dynamically rotate the second graphic data as rendered for the physical display, and
wherein in a second operation, the system instructions, when executed, cause the at least one processor to:
execute the first instructions for generating the 2D user interface to cause the at least one processor to provide the first graphic data;
reroute the first graphic data to the virtual display, wherein the virtual display is configured to store and rotate the first graphic data as rendered for the physical display; and
execute the second instructions for generating the 3D VR environment to cause the at least one processor to:
obtain the first graphic data from the virtual display;
render, in the 3D VR environment, at least part of the 2D user interface as a user interface object using the first graphic data; and
provide the rendered user interface object, in the 3D VR environment, to the physical display.

19. The non-transitory computer readable medium as set forth in claim 18, wherein in the first operation, the system instructions are configured when executed to cause the at least one processor to:
create a first logical display that directs the first graphic data to the physical display; and
create a second logical display that directs the second graphic data to the virtual display.

20. The non-transitory computer readable medium as set forth in claim 19, wherein in the second operation, the system instructions are further configured when executed to cause the at least one processor to:
create the first logical display such that the first logical display directs the first graphic data to the virtual display; and
create the second logical display such that the second logical display directs the second graphic data to the physical display.

21. The non-transitory computer readable medium as set forth in claim 18, wherein in the second operation, the system instructions are further configured when executed to cause the at least one processor to:
receive a selection of a mobile application;
execute the first instructions to cause the at least one processor to generate two or more image layers;
cause a hardware composer to combine the two or more image layers into a composite 2D image; and
provide the composite 2D image to the virtual display as the first graphic data.

22. The non-transitory computer readable medium as set forth in claim 21, wherein in the second operation, the system instructions are further configured when executed to cause the at least one processor to:
execute the second instructions to cause the at least one processor to render the user interface object using at least part of the first graphic data and a background image; and
provide the rendered user interface object to the physical display.

23. The non-transitory computer readable medium as set forth in claim 18, wherein, in the second operation, the system instructions are further configured when executed to cause the at least one processor to provide the first graphic data to the virtual display and to dynamically rotate the first graphic data in the virtual display, wherein the dynamically rotated first graphic data becomes the first graphic data that the second instructions cause the at least one processor to obtain.

24. The electronic device of claim 1, wherein a stream from the virtual display is directed to a scene graphics module of a 3D engine to be part of a 3D graphic image for display in the 3D VR environment.

25. The electronic device of claim 1, wherein the first graphic data in the virtual display is rendered with a 3D graphic background so that the first graphic data becomes a window in or over a 3D VR screen background image.

* * * * *